United States Patent
Diligenti et al.

(10) Patent No.: US 9,110,975 B1
(45) Date of Patent: Aug. 18, 2015

(54) SEARCH RESULT INPUTS USING VARIANT GENERALIZED QUERIES

(75) Inventors: Michelangelo Diligenti, Zurich (CH); Hyung-Jin Kim, Sunnyvale, CA (US); Robert J. Stets, Jr., Palo Alto, CA (US)

(73) Assignee: Google Inc., Mountain View, CA (US)

( * ) Notice: Subject to any disclaimer, the term of this patent is extended or adjusted under 35 U.S.C. 154(b) by 163 days.

(21) Appl. No.: 11/556,100

(22) Filed: Nov. 2, 2006

(51) Int. Cl.
G06F 17/30 (2006.01)

(52) U.S. Cl.
CPC .............................. *G06F 17/30646* (2013.01)

(58) Field of Classification Search
CPC ................... G06F 17/30442; G06F 17/30646
USPC ............... 707/3, 104.1, 769, 723, 748; 704/1; 705/14
See application file for complete search history.

(56) References Cited

U.S. PATENT DOCUMENTS

| | | | |
|---|---|---|---|
| 5,265,065 A | 11/1993 | Turtle | |
| 6,014,665 A | 1/2000 | Culliss | |
| 6,076,051 A * | 6/2000 | Messerly et al. ................... | 704/9 |
| 6,078,916 A | 6/2000 | Culliss | |
| 6,182,068 B1 | 1/2001 | Culliss | |
| 6,327,590 B1 * | 12/2001 | Chidlovskii et al. ............... | 707/5 |
| 6,363,378 B1 * | 3/2002 | Conklin et al. ..................... | 707/5 |
| 6,480,843 B2 * | 11/2002 | Li ....................................... | 707/5 |
| 6,490,575 B1 | 12/2002 | Berstis | |
| 6,539,377 B1 | 3/2003 | Culliss | |
| 6,671,681 B1 | 12/2003 | Emens et al. | |
| 6,701,309 B1 | 3/2004 | Beeferman et al. | |
| 6,738,764 B2 * | 5/2004 | Mao et al. .............................. | 1/1 |
| 6,792,416 B2 | 9/2004 | Soetarman et al. | |
| 6,816,850 B2 | 11/2004 | Culliss | |
| 6,944,612 B2 | 9/2005 | Roustant et al. | |
| 7,085,761 B2 * | 8/2006 | Shibata .............................. | 707/5 |
| 7,113,939 B2 | 9/2006 | Chou et al. | |
| 7,146,361 B2 | 12/2006 | Broder et al. | |
| 7,222,127 B1 | 5/2007 | Bem et al. | |
| 7,231,399 B1 | 6/2007 | Bem et al. | |
| 7,243,102 B1 | 7/2007 | Naam et al. | |
| 7,379,951 B2 * | 5/2008 | Chkodrov et al. ......... | 707/104.1 |
| 7,426,507 B1 | 9/2008 | Patterson | |
| 7,451,487 B2 | 11/2008 | Oliver et al. | |
| 7,516,146 B2 | 4/2009 | Robertson et al. | |
| 7,526,470 B1 | 4/2009 | Karnawat et al. | |
| 7,533,130 B2 | 5/2009 | Narayana et al. | |

(Continued)

OTHER PUBLICATIONS

Agichtein, Eugene et al., "Improving Web Search Ranking by Incorporating User Behavior Information", *SIGIR '06*, Aug. 6-11, 2006, Seattle, WA, pp. 19-26.

(Continued)

*Primary Examiner* — Sherief Badawi
*Assistant Examiner* — Sabana s Rahman
(74) *Attorney, Agent, or Firm* — Fish & Richardson P.C.

(57) ABSTRACT

Systems, methods and computer program products for generalizing a user-submitted query by forming one or more variants of the user-submitted query to generate one or more other queries, each of the one or more other queries being different from the user-submitted query. A generalized quality of result statistic is derived for a first document from respective data associated with each of the other queries, each respective data being indicative of user behavior relative to the first document as a search result for the associated other query. The generalized quality of result statistic is provided as the quality of result statistic input to a document ranking process for the first document and the user-submitted query.

15 Claims, 14 Drawing Sheets

(56) References Cited

U.S. PATENT DOCUMENTS

| | | | |
|---|---|---|---|
| 7,693,818 B2 | 4/2010 | Majumder | |
| 7,747,612 B2 | 6/2010 | Thun et al. | |
| 7,783,632 B2 | 8/2010 | Richardson et al. | |
| 7,801,885 B1 | 9/2010 | Verma | |
| 7,809,716 B2 | 10/2010 | Wang et al. | |
| 7,818,320 B2 | 10/2010 | Makeev | |
| 7,836,058 B2 | 11/2010 | Chellapilla | |
| 7,844,589 B2 | 11/2010 | Wang et al. | |
| 7,849,089 B2 | 12/2010 | Zhang et al. | |
| 7,853,557 B2 | 12/2010 | Schneider et al. | |
| 7,877,404 B2 | 1/2011 | Achan et al. | |
| 7,895,177 B2 | 2/2011 | Wu | |
| 7,953,740 B1* | 5/2011 | Vadon et al. | 707/751 |
| 7,974,974 B2 | 7/2011 | Tankovich et al. | |
| 7,987,185 B1 | 7/2011 | Mysen et al. | |
| 8,024,330 B1 | 9/2011 | Franco et al. | |
| 8,027,439 B2 | 9/2011 | Zoldi et al. | |
| 8,037,042 B2 | 10/2011 | Anderson et al. | |
| 8,037,043 B2 | 10/2011 | Zoeter et al. | |
| 8,051,061 B2 | 11/2011 | Niu et al. | |
| 8,065,296 B1 | 11/2011 | Franz et al. | |
| 8,073,263 B2 | 12/2011 | Hull et al. | |
| 8,073,772 B2 | 12/2011 | Bishop et al. | |
| 8,086,599 B1 | 12/2011 | Heymans | |
| 8,156,111 B2 | 4/2012 | Jones et al. | |
| 2002/0034292 A1 | 3/2002 | Tuoriniemi et al. | |
| 2002/0103790 A1 | 8/2002 | Wang et al. | |
| 2002/0138478 A1* | 9/2002 | Schwartz et al. | 707/3 |
| 2003/0009399 A1 | 1/2003 | Boerner | |
| 2003/0018707 A1 | 1/2003 | Flocken | |
| 2003/0028529 A1 | 2/2003 | Cheung et al. | |
| 2003/0037074 A1 | 2/2003 | Dwork et al. | |
| 2003/0167252 A1 | 9/2003 | Odom et al. | |
| 2003/0195877 A1 | 10/2003 | Ford et al. | |
| 2003/0220913 A1 | 11/2003 | Doganata et al. | |
| 2004/0006740 A1 | 1/2004 | Krohn et al. | |
| 2004/0034632 A1 | 2/2004 | Carmel et al. | |
| 2004/0083205 A1 | 4/2004 | Yeager | |
| 2004/0093325 A1 | 5/2004 | Banerjee et al. | |
| 2004/0158560 A1 | 8/2004 | Wen et al. | |
| 2004/0186996 A1 | 9/2004 | Gibbs et al. | |
| 2004/0199419 A1* | 10/2004 | Kim et al. | 705/14 |
| 2004/0215607 A1 | 10/2004 | Travis, Jr. | |
| 2005/0015366 A1 | 1/2005 | Carrasco et al. | |
| 2005/0021397 A1* | 1/2005 | Cui et al. | 705/14 |
| 2005/0060290 A1* | 3/2005 | Herscovici et al. | 707/3 |
| 2005/0060310 A1* | 3/2005 | Tong et al. | 707/7 |
| 2005/0060311 A1 | 3/2005 | Tong et al. | |
| 2005/0071741 A1* | 3/2005 | Acharya et al. | 715/500 |
| 2005/0102259 A1* | 5/2005 | Kapur | 707/1 |
| 2005/0102282 A1 | 5/2005 | Linden | |
| 2005/0125376 A1 | 6/2005 | Curtis et al. | |
| 2005/0160083 A1 | 7/2005 | Robinson | |
| 2005/0198026 A1 | 9/2005 | Dehlinger et al. | |
| 2005/0222987 A1 | 10/2005 | Vadon | |
| 2005/0240576 A1 | 10/2005 | Piscitello et al. | |
| 2005/0240580 A1 | 10/2005 | Zamir et al. | |
| 2005/0256848 A1* | 11/2005 | Alpert et al. | 707/3 |
| 2006/0047643 A1 | 3/2006 | Chaman | |
| 2006/0069667 A1 | 3/2006 | Manasse et al. | |
| 2006/0074903 A1* | 4/2006 | Meyerzon et al. | 707/5 |
| 2006/0089926 A1* | 4/2006 | Knepper et al. | 707/3 |
| 2006/0095421 A1 | 5/2006 | Nagai et al. | |
| 2006/0106793 A1 | 5/2006 | Liang | |
| 2006/0173830 A1 | 8/2006 | Smyth et al. | |
| 2006/0195443 A1 | 8/2006 | Franklin et al. | |
| 2006/0200476 A1 | 9/2006 | Gottumukkala et al. | |
| 2006/0200556 A1 | 9/2006 | Brave et al. | |
| 2006/0253428 A1* | 11/2006 | Katariya et al. | 707/3 |
| 2007/0005575 A1 | 1/2007 | Dai et al. | |
| 2007/0005588 A1 | 1/2007 | Zhang et al. | |
| 2007/0038659 A1 | 2/2007 | Datar et al. | |
| 2007/0061211 A1 | 3/2007 | Ramer et al. | |
| 2007/0081197 A1 | 4/2007 | Omoigui | |
| 2007/0106659 A1 | 5/2007 | Lu et al. | |
| 2007/0112730 A1 | 5/2007 | Gulli et al. | |
| 2007/0130370 A1 | 6/2007 | Akaezuwa | |
| 2007/0156677 A1 | 7/2007 | Szabo | |
| 2007/0192190 A1 | 8/2007 | Granville | |
| 2007/0208730 A1* | 9/2007 | Agichtein et al. | 707/5 |
| 2007/0214131 A1* | 9/2007 | Cucerzan et al. | 707/5 |
| 2007/0233653 A1 | 10/2007 | Biggs et al. | |
| 2007/0260597 A1* | 11/2007 | Cramer | 707/5 |
| 2007/0266021 A1 | 11/2007 | Aravamudan et al. | |
| 2007/0266439 A1 | 11/2007 | Kraft | |
| 2007/0288450 A1 | 12/2007 | Datta et al. | |
| 2008/0010143 A1 | 1/2008 | Kniaz et al. | |
| 2008/0027913 A1 | 1/2008 | Chang et al. | |
| 2008/0052219 A1 | 2/2008 | Sandholm et al. | |
| 2008/0052273 A1 | 2/2008 | Pickens | |
| 2008/0059453 A1 | 3/2008 | Laderman | |
| 2008/0077570 A1 | 3/2008 | Tang et al. | |
| 2008/0082518 A1 | 4/2008 | Loftesness | |
| 2008/0091650 A1 | 4/2008 | Fontoura et al. | |
| 2008/0114624 A1 | 5/2008 | Kitts | |
| 2008/0114729 A1 | 5/2008 | Raman et al. | |
| 2008/0114750 A1 | 5/2008 | Saxena et al. | |
| 2008/0140699 A1 | 6/2008 | Jones et al. | |
| 2008/0162475 A1 | 7/2008 | Meggs et al. | |
| 2008/0183660 A1 | 7/2008 | Szulczewski | |
| 2008/0189269 A1 | 8/2008 | Olsen | |
| 2008/0208825 A1 | 8/2008 | Curtis et al. | |
| 2008/0228442 A1 | 9/2008 | Lippincott et al. | |
| 2008/0256050 A1 | 10/2008 | Zhang et al. | |
| 2008/0313168 A1 | 12/2008 | Liu et al. | |
| 2008/0313247 A1 | 12/2008 | Galvin | |
| 2009/0012969 A1 | 1/2009 | Rail et al. | |
| 2009/0055392 A1 | 2/2009 | Gupta et al. | |
| 2009/0157643 A1 | 6/2009 | Gollapudi et al. | |
| 2009/0182723 A1 | 7/2009 | Shnitko et al. | |
| 2009/0287656 A1 | 11/2009 | Bennett | |
| 2010/0131563 A1 | 5/2010 | Yin | |
| 2010/0205541 A1 | 8/2010 | Rapaport et al. | |
| 2010/0241472 A1 | 9/2010 | Hernandez | |
| 2011/0064795 A1 | 3/2011 | Tosi et al. | |
| 2011/0295844 A1 | 12/2011 | Sun et al. | |

OTHER PUBLICATIONS

Agichtein, Eugene et al., "Learning User Interaction Models for Predicting Web Search Result Preferences", *Proceedings of the 29th Annual International ACM SIGIR Conference on Research and Development in Information Retrieval*, Seattle Washington, (2006), pp. 3-10.

Boyan, Justin et al., "A Machine Learning Architecture for Optimizing Web Search Engines", School of Computer Science, Carnegie Mellon University, May 10, 1996, to appear in AAAI Workshop in Internet-Based Information Systems, Oregon, 1996, pp. 1-8.

Cutrell, Edward et al., "Eye tracking MSN Search: Investigating snippet length, target position and task types", Jan. 2007, pp. 1-13.

Joachims, Thorsten, "Optimizing Search Engines using Clickthrough Data", *Proceedings of the Eighth ACM SIGKDD International Conference on Knowledge Discovery and Data Mining*, Edmonton, Alberta, Canada (2002), pp. 133-142.

Kelly, Diane et al., "Implicit Feedback for Inferring User Preference: A Bibliography", SCILS, Rutgers University, New Brunswick, NJ 08901, 11 pages.

U.S. Appl. No. 12/331,872, Le et al.

U.S. Appl. No. 13/476,875, filed May 21, 2012, Ranking Search Results Based on Similar Queries, Lopatenko et al.

U.S. Appl. No. 12/717,475, filed Mar. 4, 2010, Deriving Site Reputation and Focus From User Feedback Statistics, Thakur, et al.

U.S. Appl. No. 12/623,276, filed Nov. 20, 2009, Modifying Scoring Data Based on Historical Changes, Kim et al.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

(56) References Cited

OTHER PUBLICATIONS

Boldi, et al.; *The Query-flow Graph: Model and Applications*; CKIM '08, Oct. 26-30, Napa Valley, California, USA, pp. 609-617.
Burke, Robin, Integrating Knowledge-based and Collaborative-filtering Recommender Systems, AAAI Technical Report WS-99-01, Compilation copyright © 1999, AAAI (www.aaai.org), pp. 69-72.
Craswell, et al.; "Random Walks on the Click Graph"; Jul. 2007; SIGIR '07, Amsterdam, the Netherlands, 8 pages.
Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.
Hofmann, Thomas, *Latent Semantic Models for Collaborative Filtering*, ACM Transactions on Information Systems, vol. 22, No. 1, Jan. 2004, pp. 89-115.
Google News archive, Jul. 8, 2003, Webmasterworld.com, [online] Retrieved from the Internet http://www.webmasterwolrd.com/forum3/15085.htm [retrieved on Nov. 20, 2009] 3 pages.
Grčar, Miha, *User Profiling: Collaborative Filtering*, SIKDD 2004, Oct. 12-15, 2004, Ljubljana, Slovenia, 4 pages.
Joachims, T., Evaluating retrieval performance using clickthrough data. Proceedings of the SIGIR Workshop on Mathematical/Formal Methods in Information Retrieval; Aug. 12-15, 2002; Tampere, Finland, 18 pages.
Joachims et al., "Search Engines that Learn from Implicit Feedback"; Aug. 2007, IEEE Computer Society.
Linden, Greg et al., *Amazon.com Recommendations: Item-to-Item Collaborative Filtering*, [online ], http://computer.org/internet/, IEEE Internet Computing, Jan.-Feb. 2003, IEEE Computer Society, pp. 76-80.
U.S. Appl. No. 11/556,143, filed Nov. 2, 2006, in Office Action mailed Jan. 25, 2010, 14 pages.
U.S. Appl. No. 11/556,143, filed Nov. 2, 2006, in Office Action mailed Jul. 6, 2010, 20 pages.
U.S. Appl. No. 11/556,143, filed Nov. 2, 2006, in Office Action mailed Apr. 20, 2011, 18 pages.
McDonnell, Philip, A., "Time Based Ranking," U.S. Appl. No. 11/870,893, filed Oct. 11, 2007, to be published by the USPTO in a file wrapper, 42 pages.
Nicole, Kristen, Heeii is StumbleUpon Plus Google Suggestions, [online], Retrieved from the Internet http://mashable.com/2007/05/15/heeii/, 11 pages.
Lemire, Daniel, *Scale and Translation Invariant Collaborative Filtering Systems*, Published in Information Retrieval, 8(1), pp. 129-150, 2005.
U.S. Appl. No. 11/685,095, filed Mar. 12, 2007, in Office Action mailed Feb. 8, 2010, 31 pages.
U.S. Appl. No. 11/685,095, filed Mar. 12, 2007, in Office Action mailed Feb. 25, 2009, 21 pages.
U.S. Appl. No. 11/685,095, filed Mar. 12, 2007, in Office Action mailed Sep. 10, 2009, 23 pages.
U.S. Appl. No. 11/685,095, filed Mar. 12, 2007, in Office Action mailed Apr. 13, 2011, 31 pages.
Radlinski, et al., *Query Chains: Learning to Rank from Implicit Feedback*, KDD '05, Aug. 21-24, 2005, Chicago, Illinois, USA, 10 pages.
U.S. Appl. No. 11/556,086, filed Nov. 2, 2006, in Office Action mailed Jun. 23, 2010, 21 pages.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users*, ADC, 2001, pp. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.
Zeng, et al., "Learning to Cluster Web Search Results", SIGIR '04, Proceedings of the 27th Annual International ACM SIGIR conference on research and development in information retrieval, 2004.
Joachims, "Evaluating Search Engines Using Clickthrough Data", Cornell University, Department of Computer Science, Draft, Feb. 19, 2002, 13 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
U.S. Appl. No. 13/310,901, filed Dec. 5, 2011, Kim et al., Refining Search Results.
U.S. Appl. No. 13/608,278, filed Sep. 10, 2012, Kuramochi et al., Collecting Image Search Event Information.
U.S. Appl. No. 13/620,528, filed Sep. 14, 2012, Kim et al., Refining Search Results.
U.S. Appl. No. 13/953,162, filed Jul. 29, 2013, Kim et al.
U.S. Appl. No. 14/143,622, filed Dec. 30, 2013, Kim et al.
U.S. Appl. No. 12/825,461, filed Jun. 29, 2010, Kim et al.
U.S. Appl. No. 13/617,019, filed Sep. 14, 2012, Tong et al.
U.S. Appl. No. 13/898,363, filed May 20, 2013, Tong et al.

\* cited by examiner

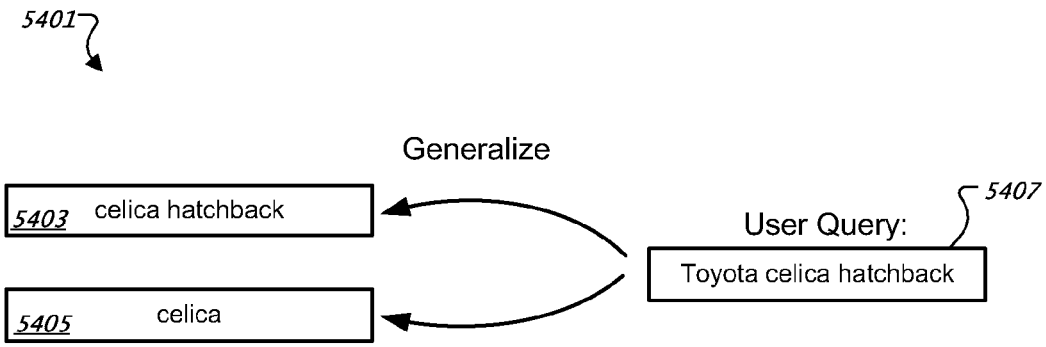
FIG. 5E1
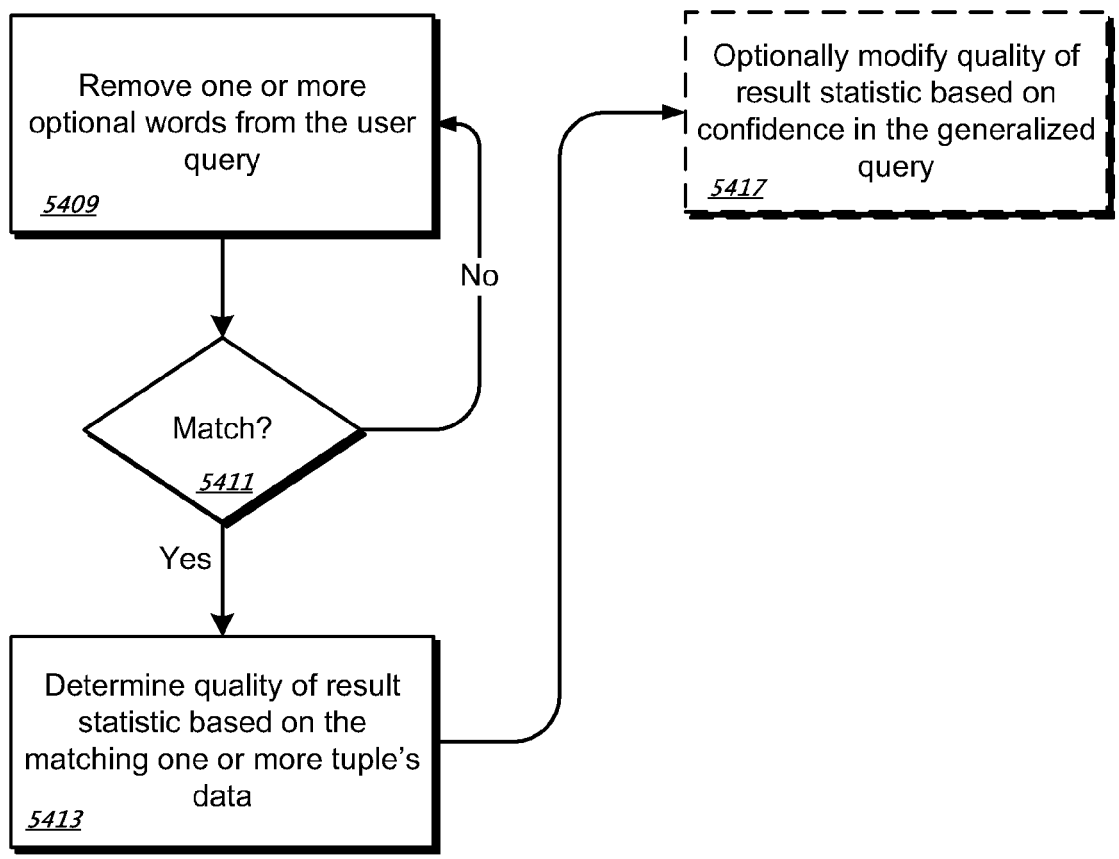
FIG. 5E2

SEARCH RESULT INPUTS USING VARIANT GENERALIZED QUERIES

BACKGROUND

The present disclosure relates to ranking of search results.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance, generally associated with the GOGGLE® PageRank technology, is premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

Systems, methods, and apparatus including computer program products for ranking search results of a search query are described. In general, particular inputs may be generated or analyzed to affect the presentation of search results. For example, such inputs may increase the relevance that a system will assign to a particular result in a particular situation, thus boosting the score or other indicator of relevance for the result (and perhaps the relevance of the result in the context of a particular query). Such an approach may benefit a user by providing them with search results that are more likely to match their needs. As a result, users can learn more using the internet, can find more relevant information more quickly, and will thus achieve more in their work or elsewhere, and will be more likely to use such a system again. A provider of such services may also benefit, by providing more useful services to users, and by thereby inducing more traffic to their search services. Such additional traffic may provide an operator with additional revenue, such as in the form of advertising that accompanies the searching and the delivery of search results. In general, one aspect of the subject matter described in this specification can be embodied in a method that includes for a first document identified as a search result of a user user-submitted query, generalizing the user-submitted query by forming one or more variants of the user-submitted query to generate one or more other queries, each of the one or more other queries being different from the user-submitted query. A generalized quality of result statistic is generated for the first document from respective data associated with each of the other queries, each respective data being indicative of user behavior relative to the first document as a search result for the associated other query. The generalized quality of result statistic is provided as the quality of result statistic input to the document ranking process for the first document and the user-submitted query. Other embodiments of this aspect include corresponding systems, apparatus, and computer program products.

These and other embodiments can optionally include one or more of the following features. The data can be aggregated click data. The data associated with each of the other queries can be weighted. The quality of result statistic can be modified based on a level of certainty for each of the generated one or more queries. A variant of the user-submitted query is formed by performing one or more of: replacing one or more terms in the user-submitted query with synonyms, changing an order of one or more terms in the user-submitted query, or replacing one or more query terms in user-submitted query with stems. Particular embodiments of the described subject matter can be implemented to realize one or more of the following advantages. User queries can be generalized to other queries in order to take advantage of user behavior data associated with the other queries. Patterns of user interaction can be identified that indicate a user has refined a query to obtain a desired document. Based on the patterns of user interaction, user behavior data associated with the refined query can be propagated to earlier queries in the user's session. Data associated with prior queries indicative of user behavior can be combined to create a quality of result statistic that can be input to a document ranking A document's rank can be boosted in a result list for a user query in which there is no model data. User behavior statistics associated with a query having a small amount of aggregated user behavior data can take advantage of the user behavior data associated with a similar query.

The details of one or more implementations are set forth in the accompanying drawings and the description below. Other features, aspects, and advantages will become apparent from the description, the drawings, and the claims.

DESCRIPTION OF THE DRAWINGS

FIG. 5E1 is a diagram of generalization of a query through removal of optional terms.

FIG. 5E2 is a flow chart of a method for optional term generalization.

Like reference numbers and designations in the various drawings indicate like elements.

DETAILED DESCRIPTION

Figure 1:
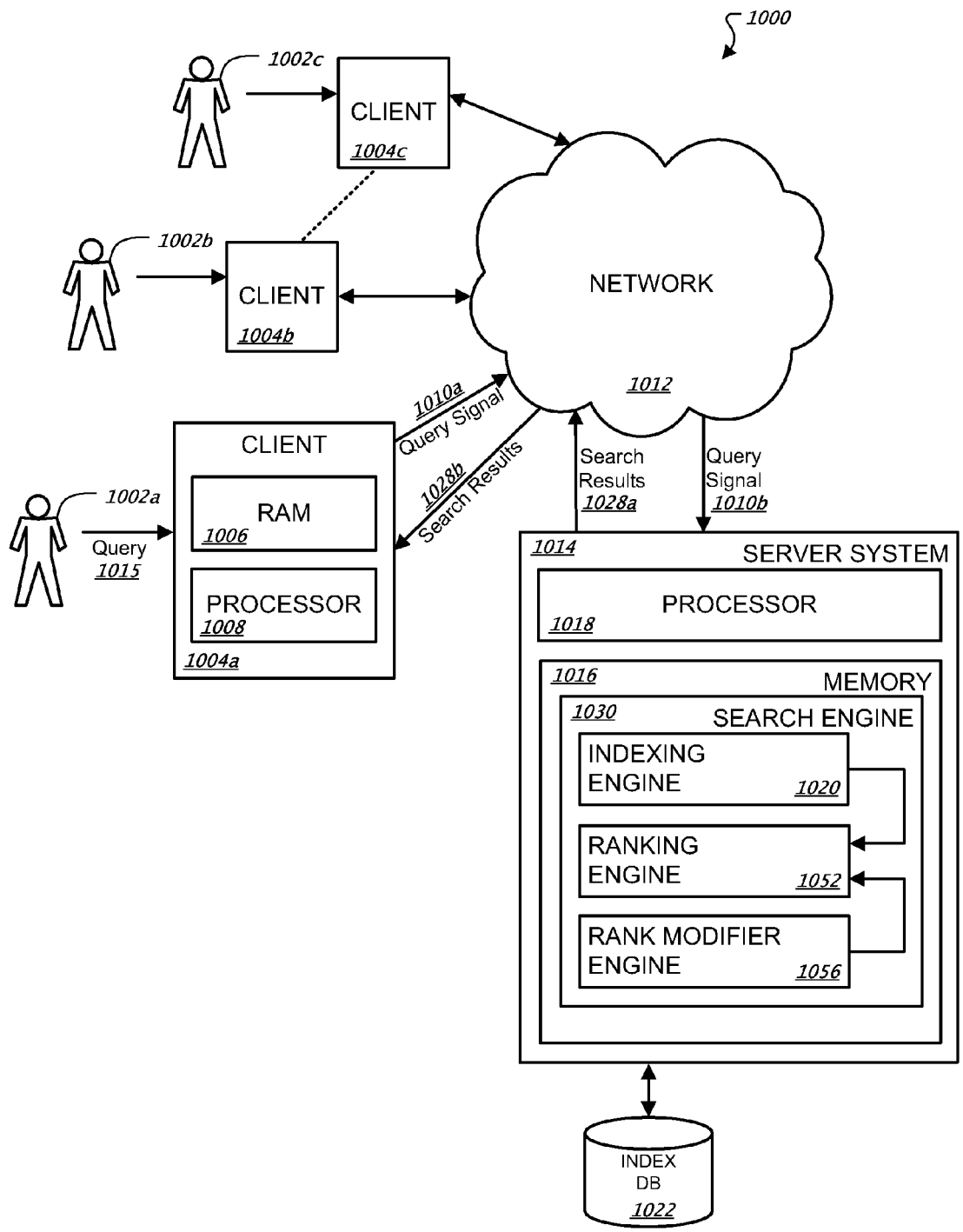
FIG. 1 shows an example information retrieval system in which the relevance of results obtained for submitted search queries can be improved.

FIG. 1 shows an example system 1000 for improving the relevance of results obtained from submitting search queries as can be implemented in an internet, intranet, or other client/server environment. The system 1000 is an example of an information retrieval system in which the systems, components and techniques described below can be implemented. Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002a can connect to the search engine 1030 within a server system 1014 to submit a query 1015. When the user 1002a submits the query 1015 through an input device attached to a client device 1004a, a client-side query signal 1010a is sent into a network 1012 and is forwarded to the server system 1014 as a server-side query signal 1010b. Server system 1014 can be one or more server devices in one or more locations. A server device 1014 includes a memory device 1016, which can include the search engine 1030 loaded therein. A processor 1018 is structured to process instructions within the device 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side query signal 1010b is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in file.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in the GOGGLE® PageRank system, which treats a link from one web page to another as an indication of quality for the latter page, so that the page with the most such quality indicators wins. Appropriate techniques can also be taken to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more measures of relevance for the documents, which can be used by the ranking engine 1052 to improve the search results' ranking provided to the user 1002. The rank modifier engine 1056 can perform one or more of the operations described further below to generate the one or more measures of relevance.

The search engine 1030 can forward the final, ranked result list within a server-side search results signal 1028a through the network 1012. Exiting the network 1012, a client-side search results signal 1028b can be received by the client device 1004a where the results can be stored within the RAM 1006 and/or used by the processor 1008 to display the results on an output device for the user 1002a.

Figure 2:
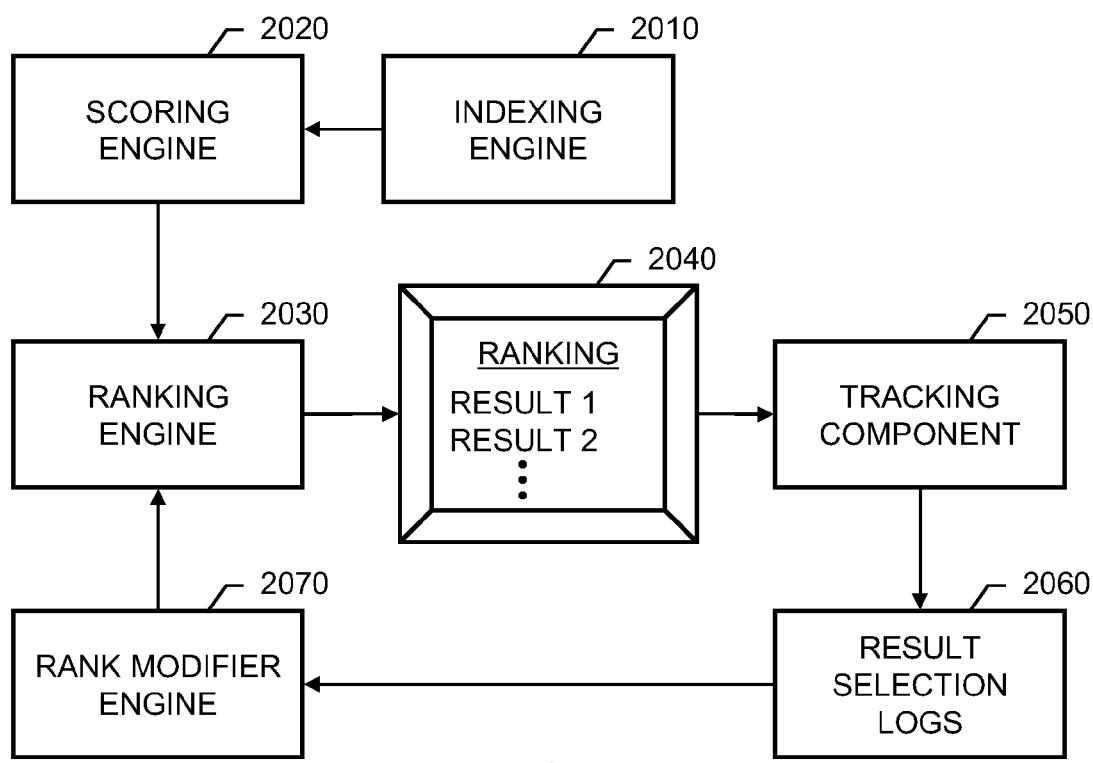
FIG. 2 shows example components of an information retrieval system.

FIG. 2 shows example components of an information retrieval system. These components can include an indexing engine 2010, a scoring engine 2020, a ranking engine 2030, and a rank modifier engine 2070. The indexing engine 2010 can function as described above for the indexing engine 1020. In addition, the scoring engine 2020 can generate scores for document results based on many different features, including content-based features that link a query to document results, and query-independent features that generally indicate the quality of documents results. The content-based features can include aspects of document format, such as query matches to title or anchor text in an HTML (Hyper Text Markup Language) page. The query-independent features can include aspects of document cross-referencing, such as the PageRank of the document or the domain. Moreover, the particular functions used by the scoring engine 2020 can be tuned, to adjust the various feature contributions to the final IR score, using automatic or semi-automatic processes. The ranking engine 2030 can produce a ranking of document results 2040 for display to a user based on IR scores received from the scoring engine 2020 and one or more signals from the rank modifier engine 2070. A tracking component 2050 can be used to record information regarding user behavior such as individual user selections of the results presented in the ranking 2040. For example, the tracking component 2050 can be embedded JavaScript code included in a web page ranking 2040 that identifies user selections (e.g., mouse clicks) of individual document results and also identifies when the user returns to the results page, thus indicating the amount of time the user spent viewing the selected document result. In other implementations, the tracking component 2050 can be proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user. The recorded information can be stored in result selection logs 2060. The recorded information can include log entries that indicate, for each user selection, the query (Q), the document (D), the user's dwell time (T) on the document, the language (L) employed by the user, and the country (C) where the user is likely located (e.g., based on the server used to access the IR system). Other information indicative of user behavior can also be recorded, such as user interactions with a presented ranking, including negative information, such as the fact that a document result was presented to a user, but was not clicked, position(s) of click(s) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, etc.

In various implementations, the time (T), also known as "click data", can be measured as the time between the initial click through to the document result until the time the user comes back to the main page and clicks on another document result. In general, an assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
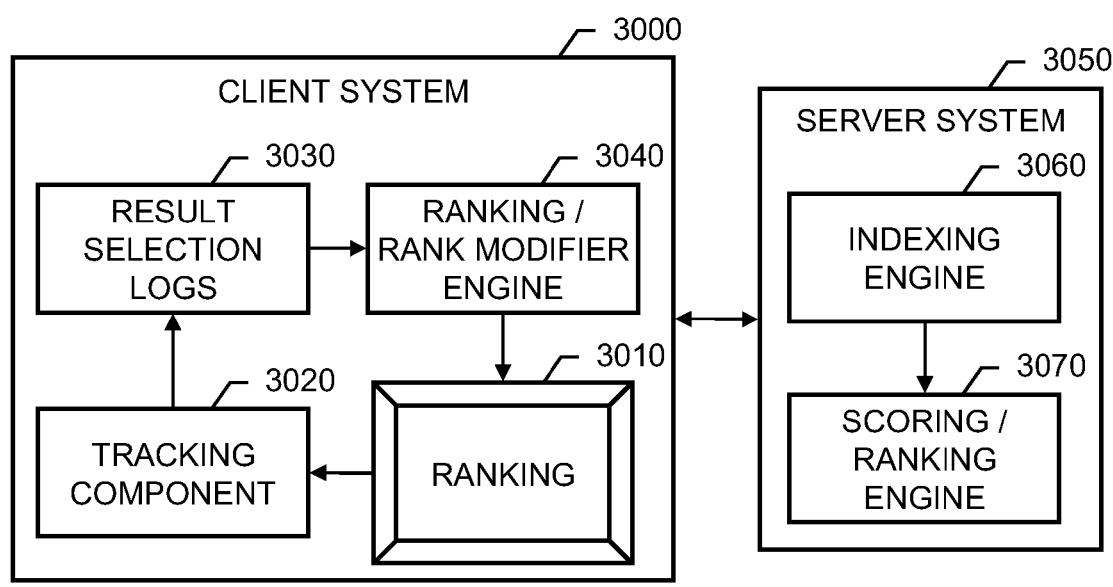
FIG. 3 shows another example information retrieval system.

FIG. 3 shows another example information retrieval system. In this system, a server system 3050 includes an indexing engine 3060 and a scoring/ranking engine 3070. A client system 3000 includes a user interface for presenting a ranking 3010, a tracking component 3020, result selection logs 3030 and a ranking/rank modifier engine 3040. For example, the client system 3000 can include a company's enterprise network and personal computers, in which a browser plug-in incorporates the ranking/rank modifier engine 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific user base.

Figure 4:
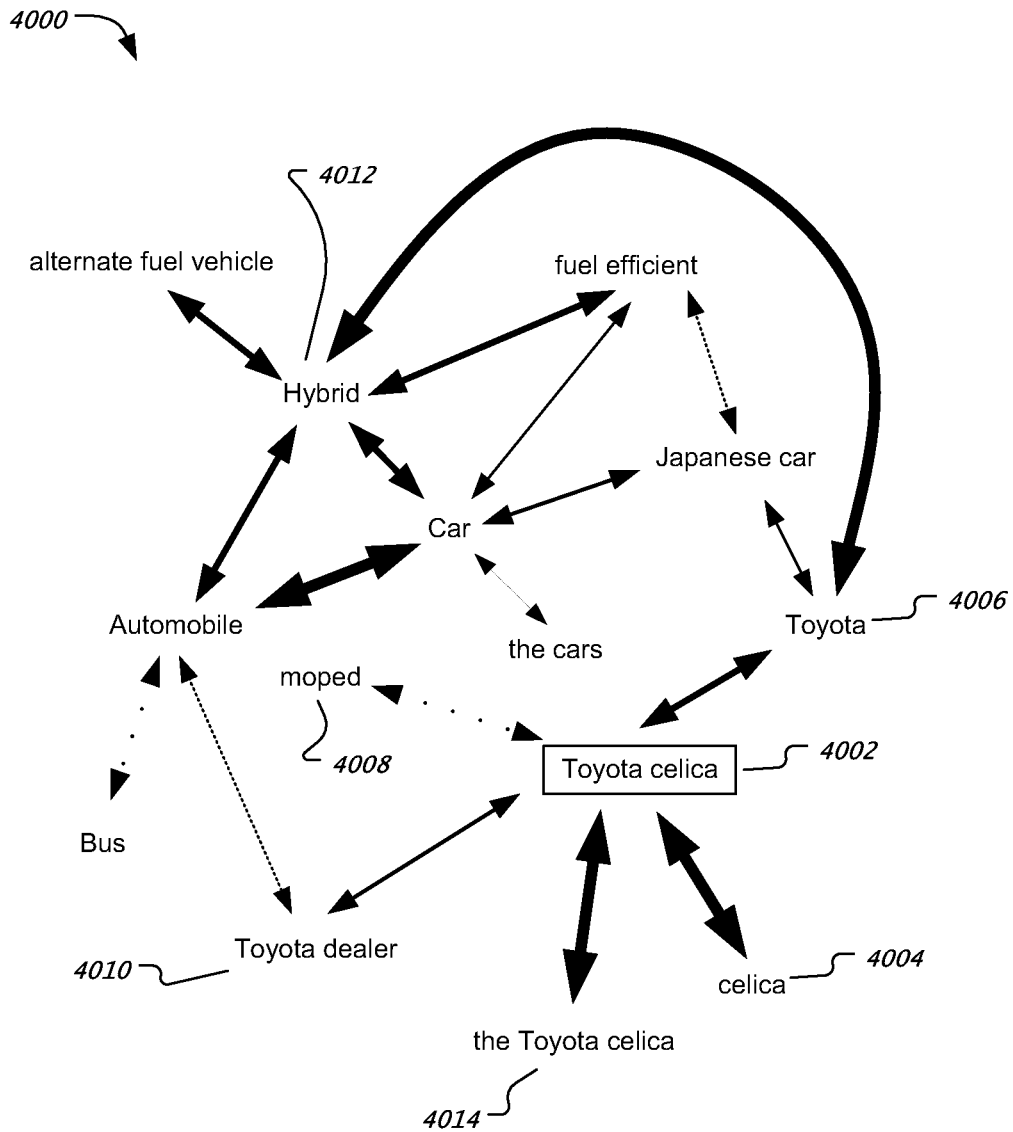
FIG. 4 is an illustration of a semantic network of user queries.

FIG. 4 is an illustration of a semantic network 4000 of user queries. Generalization of a query entails identifying one or more other queries that stand for a similar concept or are somehow related to the query. Generalizing a user query allows a ranking returned by a search engine in response to a query to be improved based on data indicative of user behavior associated with similar or related queries. This is useful when there is little or no data associated with a user's query. Generalization can be illustrated with reference to the semantic network 4000. The network 4000 illustrates relationships between user submitted queries in terms of conceptual distance, where thicker lines represent similar concepts and thinner lines represent distant concepts. For example, query 4002 "Toyota celica" is conceptually close to query 4000 "celica" and to query 4014 "the Toyota celica". But the query 4002 is conceptually distant from query 4008 "moped". In various implementations, data from queries that are related or conceptually closer are given more weight than data from other queries in generalization.

Figure 5A:
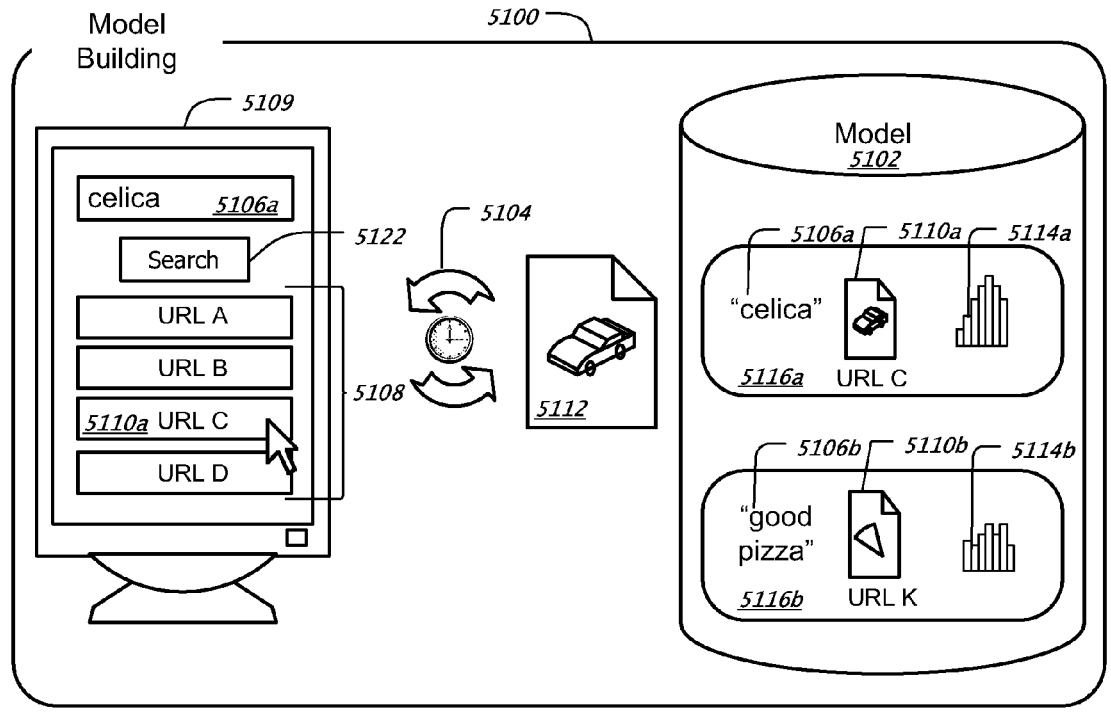
FIG. 5A is a diagram illustrating the building of a model for use with a search engine.

FIG. 5A is a diagram 5100 illustrating the building of a model 5102 for use with a search engine. The model 5102 is one or more databases that aggregate information indicative of user behavior on at least a per query and per document basis. Model 5102 information can be used as input to a process that ranks documents to enhance the ranking. For example, the model 5102 information can be used as input to interactive or non interactive Internet search engines, image search engines, video search engines, book search engines, consumer product search engines, other suitable processes capable of ranking documents, and combinations of these. In various implementations, a document is referenced by a universal resource locator (URL); however other types of references are possible. For instance, a document can be a web page on the word wide web referenced by a URL.

A user can submit a query 5106a "celica", for example, to a search engine through a graphical user interface 5109, as might be presented on a personal computer, a mobile telephone, or other device. A query includes one or more terms. For example, a query of a recipe database can include the terms "fast", "fiber" and "switch". In addition to dictionary words, terms can include special characters, numbers, mathematical expressions, Boolean expressions, slang terms, names, titles, images, sounds, videos, other suitable query terms, and combinations of these. Moreover, query terms can be in more than one language.

In response to the user selecting the search button 5122, for example, a search engine returns a ranking or result list 5108 which is an ordered list of references to documents that satisfy the query 5106a. The result list 5108 includes a set of document references URL A, URL B, URL C 5110a, and URL D. The result list 5108 can contain the text of the URL itself, a short description of the information found within each document, a snapshot of the portion of the document which contains the query, other suitable information, or a combination of these. If a user selects (e.g., clicks) URL C 5110a from the result list 5108, for example, the selected URL can cause the user interface 5109 (e.g., a web browser) to present the associated document 5112. Once the user has finished viewing the document, the user can navigate back to the result list 5108.

In various implementations, the model 5102 can be built as users interact with search engines. For example, a timer can track how long a user views or "dwells" on the document 5112. The amount of time 5104 is referred to as "click data". For example, a longer time spent dwelling on a document, termed a "long click", can indicate that a user found the document to be relevant for their query. A brief period viewing a document, termed a "short click", can be interpreted as a lack of document relevance. In various implementations, the click data 5114 is a count of each click type (e.g., long, medium, short) for a particular query 5106 and document 5110 combination. Aggregated click data from model queries for a given document can be used to create a quality of result statistic for that document and can be used to enhance a ranking of that document. By way of illustration, a quality of result statistic can be a weighted average of the count of long clicks for a given document and query.

A search engine or other process creates a record 5116 in the model 5102 for documents that are selected by users in response to a query. Each record 5116 within the model 5102 (herein referred to as a tuple: <document, query, data>) is at least a combination of a query 5106 submitted by users, a document reference 5110 selected by users in response to that query, and an aggregation of click data 5114 for all users that select the document reference 5110 in response to the query 5106. The aggregate click data can be viewed as an indication of document relevance. In various implementations, model data can be location-specific (e.g. country, state, etc) or language-specific. For example, a country-specific tuple would include the country from where the user query originated from in whereas a language-specific tuple would include the language of the user query. Other extensions of model data are possible.

Figure 5B:
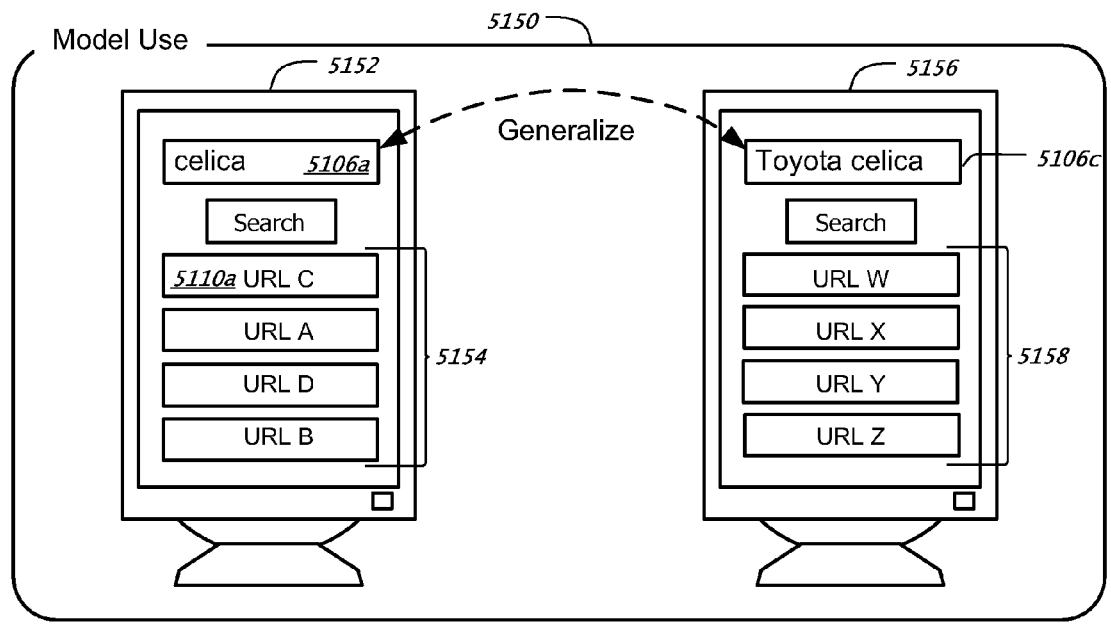
FIG. 5B is a diagram illustrating model use.

FIG. 5B is a diagram 5150 illustrating model use. Model data 5102 can be used to reorder the initial result list 5108 to take into account which documents users have found relevant for a given query 5106. A document's ranking in the result list 5108 can potentially be improved or worsened based on the aggregated click data 5114. For example, another user can submit the same query 5106a "celica" to a user interface 5152. This time, the result list 5154 for the query is reordered to reflect data stored in model 5102. For example, URL C 5110a now appears higher in the new result list 5154. In this manner, the same query can generate a different ranking of document references over time.

If a user submits the query 5106c "Toyota celica" to a user interface 5156, rather than the query 5106a "celica", there is no model 5102 information for this query as of yet. In this case, the search engine would return a document ranking without the benefit of user behavior data. However, if the search engine recognized that the query 5106c "Toyota celica" is topically the same as the query 5106a "celica" (or vice versa) this would allow the search engine to take advantage of the user behavior data 5114a in the model 5102 for the query "celica" 5106a. This is an example of generalizing a query.

Figure 5C:
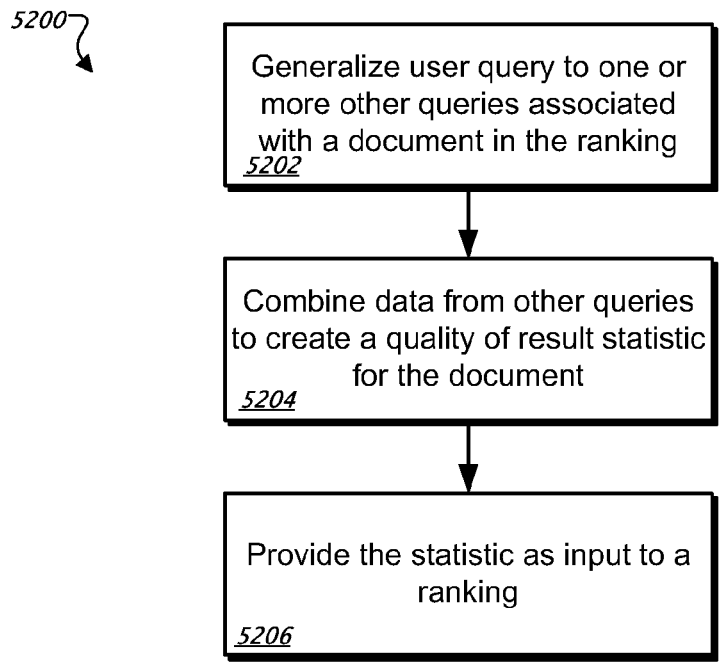
FIG. 5C is a flow chart describing a method of using data from a model to improve a document ranking.

FIG. 5C is a flow chart describing a method 5200 of using data from a model (e.g., model 5102) to improve a document ranking A user query is generalized to one or more other queries associated with a document in the document ranking (step 5202). For example, for a given document in an initial ranking, there are zero or more tuples associated with that document in a model. If none of the tuples has a query that matches the user query, the user query is generalized so that one or more potential matches of model queries can be found. Different generalization techniques can be used alone or in combination; the removal of optional terms, simplification of one or more terms to their stem form, or replacement of one or more terms with a synonym, for instance.

User behavior data is combined from the matching queries to create a quality of result statistic for the document (step 5204). In further implementations, the quality of result statistic can be modified based on a level of certainty in the generalization. For example, the statistic might be down-weighted or demoted based on belief in the accuracy of the match. The quality of result statistic is then provided as input to enhance a document ranking (step 5206).

Figure 5D:
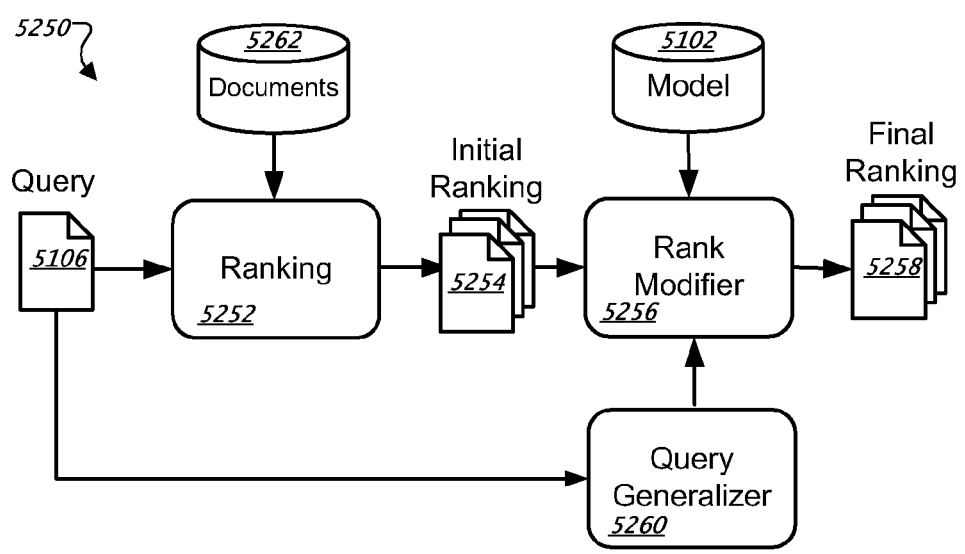
FIG. 5D is diagram illustrating a generalization system for providing input to a ranking.

FIG. 5D is diagram illustrating a generalization system 5250 for providing input to a ranking A user query 5106 is submitted to a ranking component 5252 (e.g., by way of a search engine user interface, as described above). The ranking component 5252 generates an initial ranking 5254 of documents 5262 based upon the user query 5106. Generally speaking, each document in the initial ranking 5254 has an associated score (e.g., an IR score) determined by the ranking component 5252 that specifies the document's position in the initial ranking 5254. The ranking component 5252 can use any method of determining the score, including ranking methods described above in relation to FIG. 5A. The initial ranking 5254 is provided to a rank modifier component 5256.

For one or more documents in the initial ranking 5254, the rank modifier 5256 determines a quality of result statistic for a given document based on model 5102 data for the user query 5106 and the given document. If the user query 5106 does not match a query in the model 5102 for the given document, a query generalizer component 5260 provides one or more generalized forms of the query 5106 to the rank modifier 5256 which the rank modifier 5256 can use to obtain model 5102 data for the document. The generalized queries are considered topically similar to the user query 5106 and will potentially match records in the model 5102 for the given document.

Although this diagram illustrates separate functional components, components can be divided into more components or integrated into fewer components. Moreover, components can interact on a single computing device or a plurality of computing devices connected by one or more networks or communication channels.

Figure 5E:
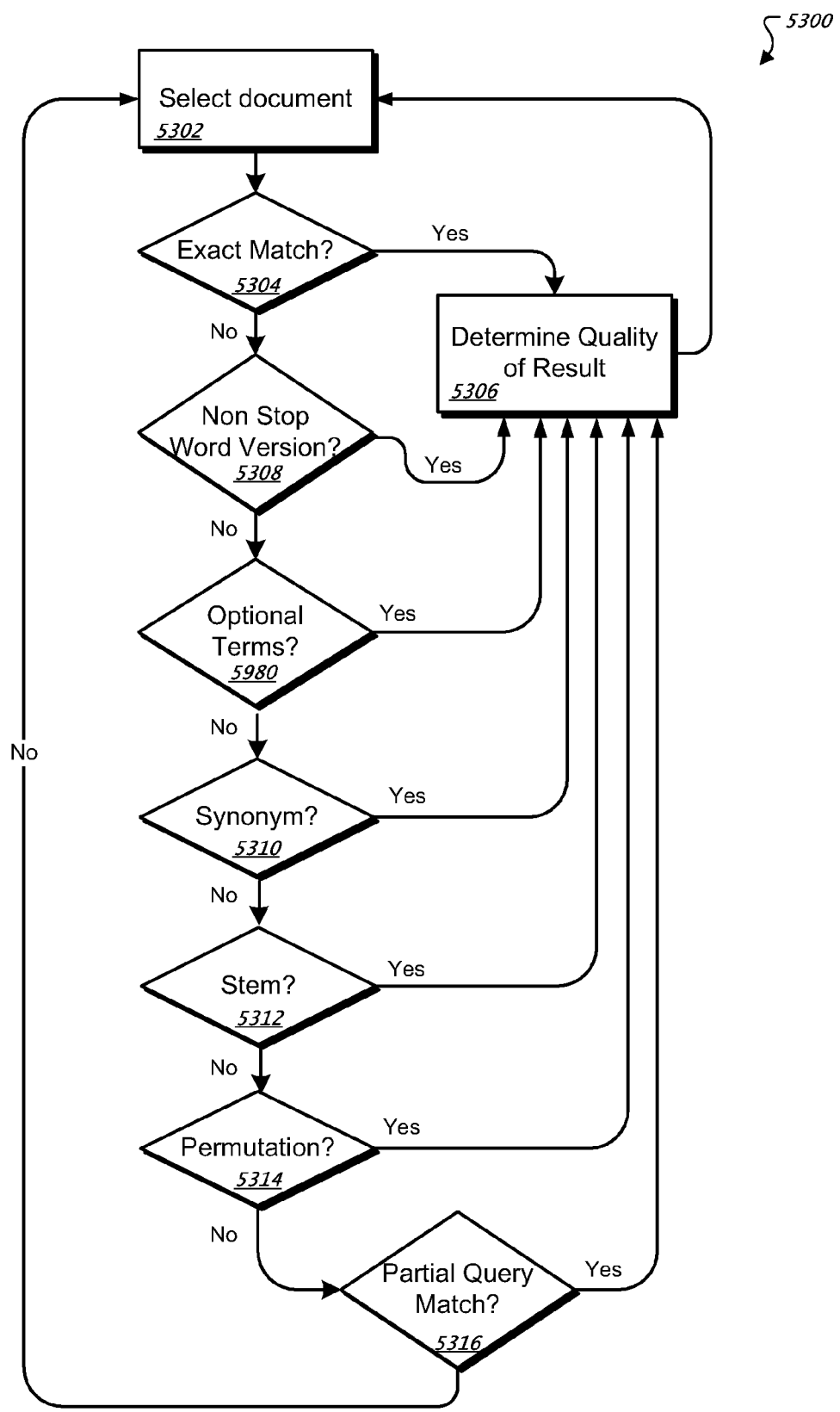
FIG. 5E is a flow chart of a method for generalizing a query.

FIG. 5E is a flow chart of a method 5300 for generalizing a query. A document is selected having an initial ranking (step 5302). For example, the initial ranking can be based on the processing of a user query 5106 by the ranking component 5252. The selected document could be obtained from an initial ranking 5254 by the rank modifier component 5256. Next, it is determined (e.g., by the rank modifier 5256) if there is an exact match between the user query and a tuple for the selected document in a model (step 5304). If so, a quality of result statistic is determined based on the model data (step 5306) and additional documents can be considered for generalization (step 5302). Otherwise, one or more attempts are made to generalize the user query such that there is a match between the generalized user query and one or more tuples for the selected document in a model.

One generalization technique is to remove one or more so-called "stop words" from the user query. In various implementations, stop words are common words that typically carry no inherent meaning by themselves or whose removal does not change the topicality of the query. Examples of stop words are adverbs, conjunctions, and forms of the verb "be". In various implementations, the fewest possible number of stop words are removed from the user query in order to obtain a match with a query associated with the selected document in the model. If there is a match (step 5308), the quality of result statistic is determined (step 5306) based on data from one or more matching tuples and additional documents can be considered for generalization (step 5302). Otherwise, a different generalization technique can be attempted.

The user query is can also be generalized by removing one or more optional terms from the user query. In various implementations, optional terms are terms that do not change the concept of a query if they are removed from the query. For example, in FIG. 5B the optional term "Toyota" is removed from the query 5106*c* to create a generalized query 5106*a*. In various implementations, the fewest possible number of optional terms are removed from the user query in order to obtain a match with a query associated with the selected document. If there is a match (step 5980), the quality of result statistic is determined (step 5306) based on data from one or more matching tuples and additional documents can be considered for generalization (step 5302). Otherwise, a different generalization technique can be attempted.

Another generalization technique is to replace one or more terms in the user query with synonyms. In various implementations, a synonym is a term that is topically similar to a term in the user query. For example, "car" is a synonym of "auto", and "photograph" is a synonym of "picture". A synonym of a query term can be determined using, for instance, the technique described in U.S. patent application Ser. No. 11/096, 726, entitled DETERMINING QUERY TERM SYNONYMS WITHIN QUERY CONTEXT, filed Mar. 31, 2005, the contents of which are incorporated herein in their entirety. In various implementations, the fewest possible number of terms in the user query are replaced synonyms order to obtain a match with a query associated with the selected document in the model. If there is a match (step 5310), the quality of result statistic is determined (step 5306) based on data from one or more matching tuples and additional documents can be considered for generalization (step 5302). Otherwise, a different generalization technique can be attempted.

Another generalization technique is to replace one or more terms in the user query with their stems. In various implementations, a stem is a different pluralization or form of speech of a term in the user query. For example, the term "matches" contains the stem term "match". In various implementations, the fewest possible number of user query terms are replaced with their stems in order to match a query associated with a document in the model. If there is a match (step 5312), the quality of result statistic is determined (step 5306) based on data from one or more matching tuples and additional documents can be considered for generalization (step 5302). Otherwise, a different generalization technique can be attempted.

Another generalization technique is to reorder one or more terms in the user query. That is, this technique creates a generalized query that is a permutation of the user query. A permutation is only applicable to a user query comprised of more than one term. For example, the query "discount airfare Orlando" can be rearranged to read "Orlando discount airfare", "discount Orlando airfare", etc. If a permutation of the user query matches one or more tuples within the model (step 5314), the data from the tuple(s) is used to determine the quality of result statistic (step 5306) and additional documents can be considered for generalization (step 5302). In various implementations, permutations of other generalized queries can also be attempted. Otherwise, a different generalization technique can be attempted.

Another generalization technique is to match part of the user query with part of a query associated with the selected document in the model. A partial query match occurs when one or more user query terms match a one or more terms of one or more model queries for a selected document. For example, the query "election candidates Seattle Wash." is a partial query match of the query "mayoral candidates Seattle", because both queries contain the terms "candidates" and "Seattle". If any portion of the user query is found to be a match for a portion of one or more model queries (step 5316), the data from the one or more matching tuples used to determine the quality of result statistic (step 5306) and additional documents can be considered for generalization (step 5302). If none of the generalization techniques produces a matching query, the process can be repeated for other documents (step 5302). Although generalizations occur in a particular sequence in this illustration, other sequences are possible including sequences with fewer or more generalization techniques. Moreover, one or more of the generalization techniques can be performed in parallel rather than serially.

In various implementations, a user query can be generalized in a plurality of ways such that the "best" generalization is determined. For a given user query and document, a plurality of generalizations (including combinations of generalizations) are determined for the user query. The generalized query with the highest score is considered the best match for the user query.

In various implementations, a plurality of generalizations can be considered by computing a so-called match belief score for each query in a model for a given document. The match belief score is based on the types of generalizations required to match a user query to one in the model for the document in question. The match belief score is a measure of the similarity between the user query and a query associated with the document in the model. For example, the match belief can be demoted for any generalization required to match the two queries. Therefore, a match that only requires a synonym substitution will be considered better than one that requires a synonym substitution and a stop word removal, for example. Generally speaking, the more generalizations that are applied, the further the match belief score is degraded. After the match belief scores are computed for all queries, the one with the highest score is chosen as the best match for the input query.

In various implementations, the match belief score can be used to down-weight or demote data associated with the chosen query, the quality of result statistic, or both. For example, if the match belief score is low, these values can be down weighted to reflect a low level of confidence in the matched query, and vice versa.

By way of illustration, TABLE 1 lists queries associated with a document in the model and corresponding match belief scores given the user query "pictures of fall color". A match belief score between 0.0 and 1.0 is determined for each query associated with the document (e.g., 0.0 for no match, 1.0 for an exact match).

TABLE 1

| MODEL QUERY | MATCH BELIEF SCORE |
|---|---|
| "pictures of fall color" | Will receive a match belief score of 1.0 because this is an exact match. |
| "pictures fall color" | Removed one stop word - now the match belief score is 0.97. |
| "picture fall color" | Replaced a word with a stem variant and removed one stop word; combined generalization penalties by multiplying them: the final match belief score is 0.97 * 0.80 = 0.776. |
| "photos color fall" | Reordered terms + one stop word removed + synonym = 0.97 (stop word removal) * 0.6 (for reordering terms) * 0.8 (for using a synonym) = 0.4656. |

FIG. 5E1 is a diagram of generalization of a query through removal of optional terms. As described above, optional terms are terms whose removal from a query will not change the query's concept. For example, if the query 5407 "Toyota celica hatchback" has the optional terms "Toyota" and "hatchback", the query 5407 can be generalized by removing one or both of the terms. Generalized query 5403 "celica hatchback" was created by removing the optional term "Toyota" where as generalized query 5405 "celica" was created by removing both optional terms.

FIG. 5E2 is a flow chart of a method for optional term generalization. If a user query does not match a <document, query, data> tuple in the model, the query generalizer component 5260 (or another process) is invoked to remove one or more optional terms from the user query (step 5409). Next, it is determined whether or not the generalized user query matches a tuple in the model (step 5411). In various implementations, as few optional terms as possible are removed from the user query to obtain a match. If no match is found, one or more additional or alternative optional terms can be removed from the user query (step 5409). Otherwise, a quality of result statistic is determined based on one or more matching tuple's data (step 5413). Optionally the quality of result statistic can be modified to reflect a level of certainty in the generalized query (step 5417). For example, a level of certainty can be based on similarity in meaning between the modified query and the user query as determined using a probabilistic model such as a Bayesian belief network or through other techniques. Other techniques for determining a level of certainty are possible.

Figure 5F:
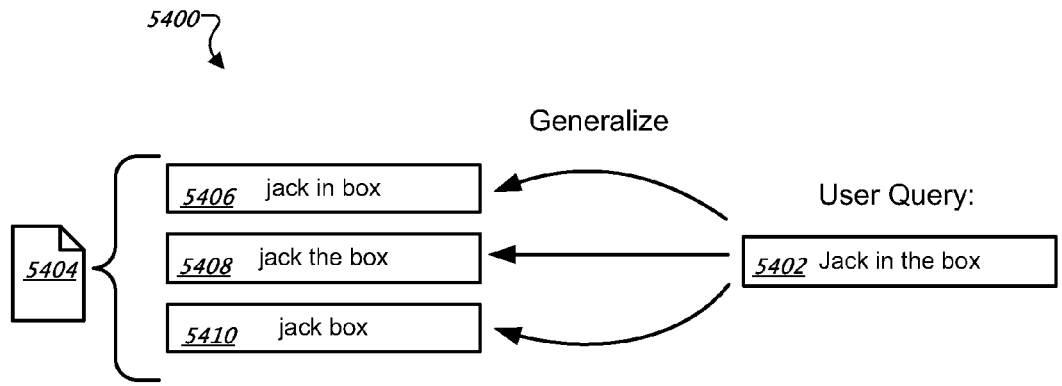
FIG. 5F is a diagram illustrating the generalization of a query through the removal of one or more stop words.

FIG. 5F is a diagram 5400 illustrating the generalization of a query through the removal of one or more stop words. Stop words are words in a user query that do not add to the topicality of the query. For example, "sailing on the Charles River", "sailing the Charles River", and "sailing along the Charles River" all contain the same core meaning. The user is interested in the sport of sailing as it pertains to a particular location, e.g. the Charles River in Boston. Removing the stop words from all three query examples generates a single query, "sailing Charles River".

As described above, a model contains tuples that each include at least a query, a document selected in response to the query, and data indicative of user behavior. For example, document 5404 is associated with queries 5406, 5408 and 5410 which could be represented as three tuples in a model, each having the same document reference (5404), a different query (5406, 5408 or 5410), and associated user behavior data. By way of illustration, if a user query 5402 "Jack in the box" was submitted to a search engine and, an initial ranking contained document 5404, there is no tuple for that document/query combination. However, by removing one or more stop words from the user query 5402, a match is possible. In this way, model coverage for generalized queries is increased. Initially, the stop word "the" is removed from the user query 5402 to create the generalized query "jack in box". The generalized query matches query 5406. As such, the user behavior data associated with the tuple <document (5404), query (5406), data> can be used to determine a quality of result statistic for document 5404. If removal of the stop word "the" from the user query 5402 did not create a match, for example, an alternate stop word could be removed instead, such as "in" to create the generalized query 5408 "jack the box". If this did not create a match, both stop words could be removed to create the generalized query 5410 "jack box". In this way, stop word generalization attempts to find a match in the model for a query and a document by removing the fewest number of stop words from the user query.

Figure 5G:
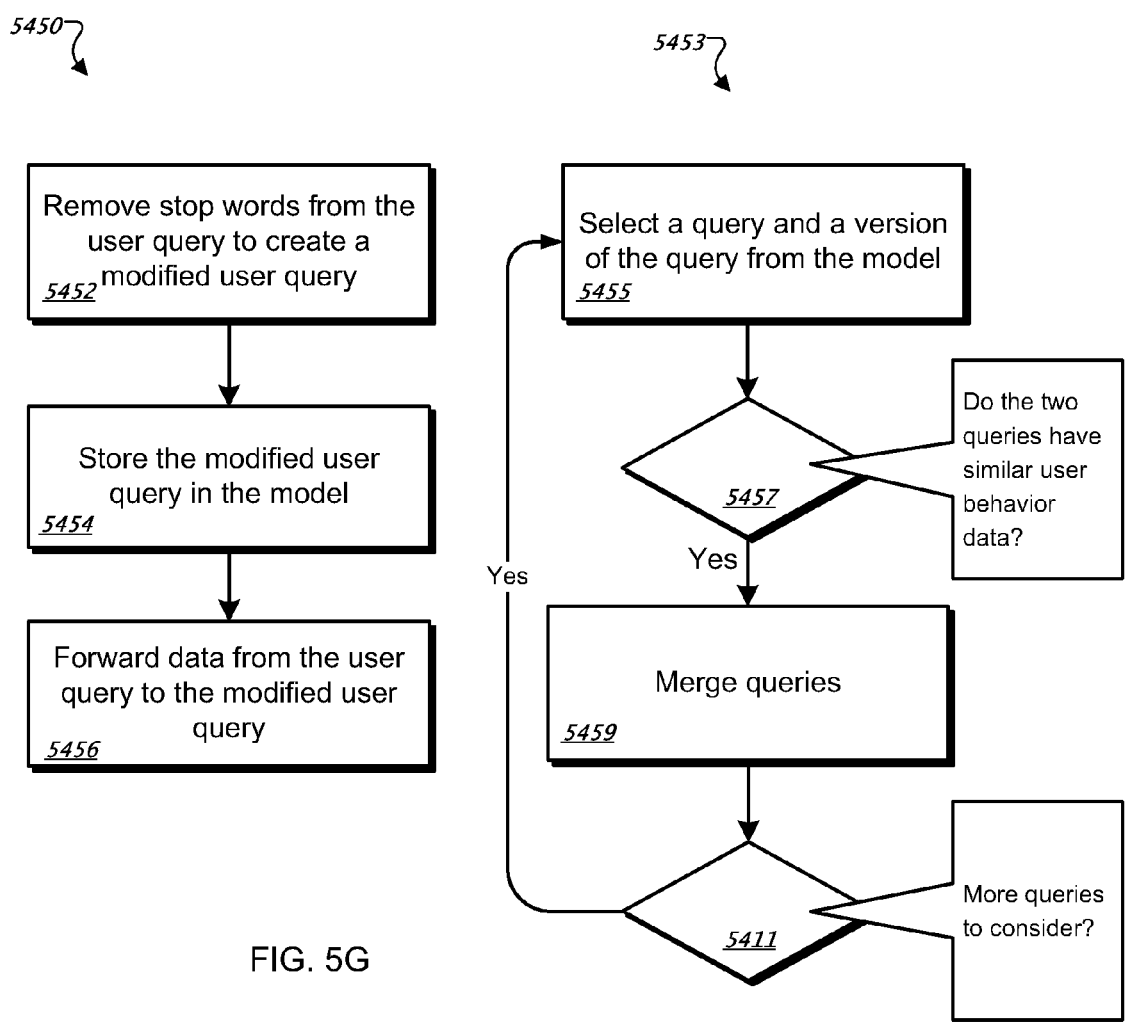
FIG. 5G is flow chart of a method for modifying a model on behalf of a query containing one or more stop words.

FIG. 5G is flow chart of a method 5450 for modifying a model on behalf of a query containing one or more stop words. When a tuple such as:

$T_1$:<$document_1$,$query_1$,$data_1$> is first created in a model (or sometime afterwards) such as in response to a user selecting a document in a result list (e.g., 5108), a new tuple can automatically be created:

$T_1'$:<$document_1$,$query_1'$,$data_1$>.

The new tuple $T_1'$ has the same document and data as $T_1$, but the $query_1'$ is a version of $query_1$ with all of the stop words removed. In addition, each time $data_1$ is modified in $T_1$ the modification can be automatically propagated to $data_1$ associated with $T_1'$. Preemptively creating versions of tuples without stop words means there will be a match of the non-stop word versions of queries.

Method 5450 captures this idea. Initially, all stop words are removed from a user query to create a modified user query (step 5452), such as $query_1'$ described above. The modified user query is stored in the model along with the user query (e.g., $query_1$) for the same document (e.g., $document_1$; step 5454). User behavior data (e.g., $data_1$) associated with the user query is then forwarded to the modified user query in the model for the same document (step 5456).

By way of illustration, if a first user submits the first query "motorcycling in the Black Hills of South Dakota", a tuple is created within the model containing the user query, and a second tuple is created containing a modified version of the user query: "motorcycling Black Hills South Dakota". When a second user submits the second query "motorcycling through Black Hills South Dakota", the second query can be reduced to the same modified query "motorcycling Black Hills South Dakota". This provides the second user with the opportunity to benefit from the user behavior data gathered from the previous user's query, even though the users did not submit identical queries. By combining user behavior data, a level of certainty in a quality of result statistic is improved.

In various implementations, model data for a query and a non stop word version of the query can be merged in the model if their data is similar. This can provide space savings in the model. A technique for doing so is provided by method 5453. Two queries are selected from the model, where one of the queries is a non stop word version of the other (step 5455). It is then determined whether the two queries' user behavior data is similar (step 5457). A metric can be used to determine similarity of the data. For example, the metric can be the normal of a vector of aggregated user behavior data. If the queries have similar data, the queries are merged into a single query (e.g., the non stop word version of the user query; step 5459). Finally, if there are more queries in the model to consider (step 5411), the process continues at step 5455. This method can be performed on a periodic or as needed basis. In various embodiments, the approach outlined in FIG. 5G can be applied for optional terms as well.

Figure 5H:
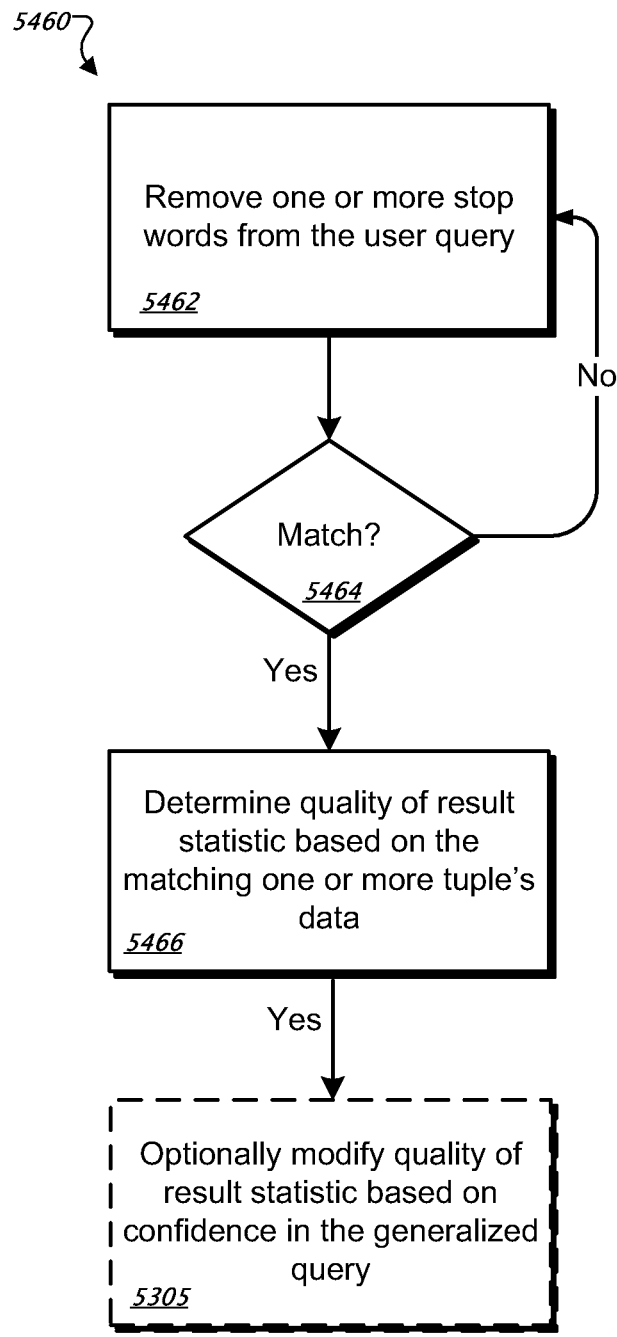
FIG. 5H is a flow chart of a method for stop word query generalization.

FIG. 5H is a flow chart of a method 5460 for stop word query generalization. For one or more documents in an initial ranking 5254, for example, the rank modifier 5256 (or another process) determines a quality of result statistic for a given document based on model 5102 data for the user query and a document. If the user query does not match a <document, query, data> tuple in the model, the query generalizer component 5260 (or another process) is invoked to remove one or more stop words from the user query (step 5462). Next, it is determined whether or not the generalized user query matches a tuple in the model (step 5464). In various implementations, as few stop words as possible are removed from the user query to obtain a match. If no match is found, one or more additional or alternative stop words can be removed from the user query (step 5462). Otherwise, a quality of result statistic is determined based on the one or more matching tuple's data (step 5466). Optionally the quality of result statistic can be modified to reflect a level of certainty in the generalized query (step 5305).

Figure 5I:
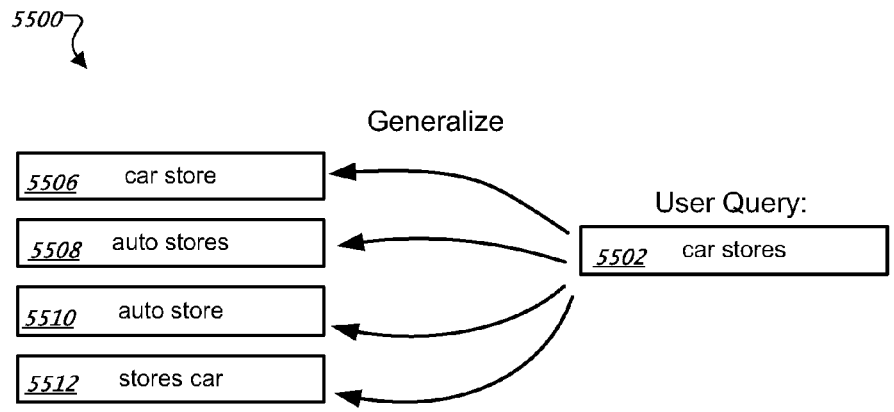
FIG. 5I is a diagram illustrating the generalization of a query through the use of variants.

FIG. 5I is a diagram 5500 illustrating the generalization of a query through the use of variants. Variants can include the permutation (e.g., reordering) of terms in a user query, the substitution of synonyms for one or more terms, the reduction of one or more terms to their stem form, or combinations of these. By way of illustration, the query generalizer 5260 or another process can produce variant generalizations to match a <document, query, data> tuples for a given document.

For example, a user query 5502 containing the terms "car stores" can be generalized to different variant forms. The term "stores" in the user query 5502 can be reduced to its stem "store" to produce a variant query 5506, "car store". The term "car" in the user query 5502 can be substituted for a synonym "auto", resulting in a variant query 5508 "auto stores". The synonym "auto" can be kept and the term "stores" can be reduced to its stem form, creating a variant query 5510, "auto store". Finally, the user query can be reordered to create a variant query 5512, "stores car". Other variants are possible.

Figure 5J:
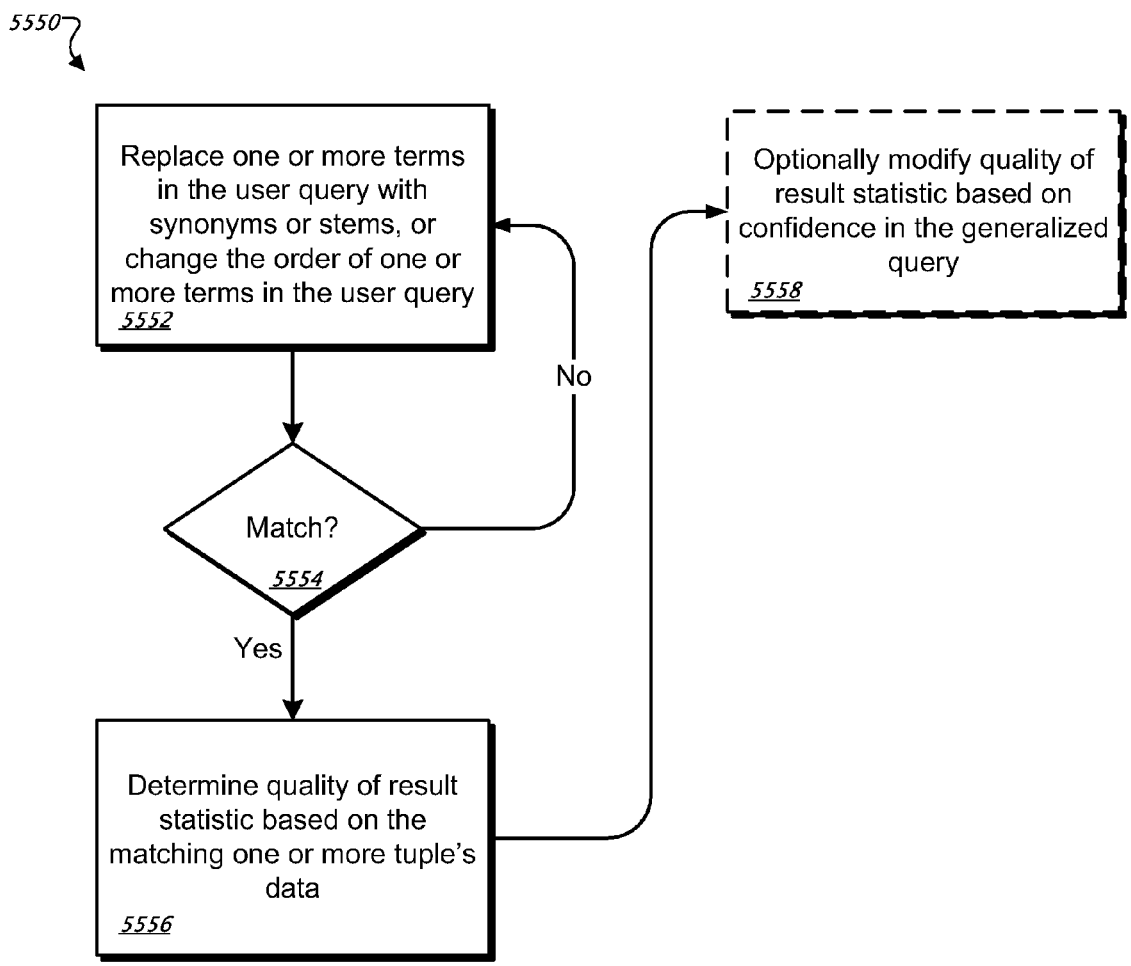
FIG. 5J is a flow chart of a method for variant query generalization.

FIG. 5J is a flow chart of a method 5550 for variant query generalization. For one or more documents in an initial ranking 5254, for example, the rank modifier 5256 (or another process) can determine a quality of result statistic for a given document based on user behavior data within the model 5102 for the user query and the document. If the user query does not exactly match a <document, query, data> tuple in the model, the query generalizer component 5260 (or another process) can be invoked to generate variants of the user query. One or more terms in the user query are replaced with synonyms or stem forms, or the order of one or more terms in the user query is changed by a query generalizer 5260, for example (step 5552). Alternatively, combinations of variants can be attempted. Next, it is determined whether a tuple is located within the model that matches the query variant (step 5554). In various implementations, the smallest number of possible changes are made to the user query to generate a matching query variant. For example, the variant query 5506, "car store", includes one modified term while the variant query 5510, "auto store", includes two terms modified from the user query 5502 "car stores". Therefore, the method 5550 can, in various implementations, first attempt single variant modifications before generalizing the query further. If no match is found (step 5554), additional and/or different variant techniques can be employed to generalize the user query (step 5552). The method 5550 can continue to attempt variations of the query until all variant combinations have been exhausted or until a match has been located. Alternatively, the "best" query variant's tuple data is used, where "best" is determined by a function that evaluates the semantic distance or other relationship between the user query and the variant query.

When a match is found for the generalized user query (step 5554), a quality of result statistic is determined based on the one or more matching tuples' user behavior data (step 5556). The quality of result statistic is then optionally modified (e.g., demoted or down-weighted) based on a level of certainty in the variant's similarity in meaning to the original query terms (step 5558).

Figure 5K:
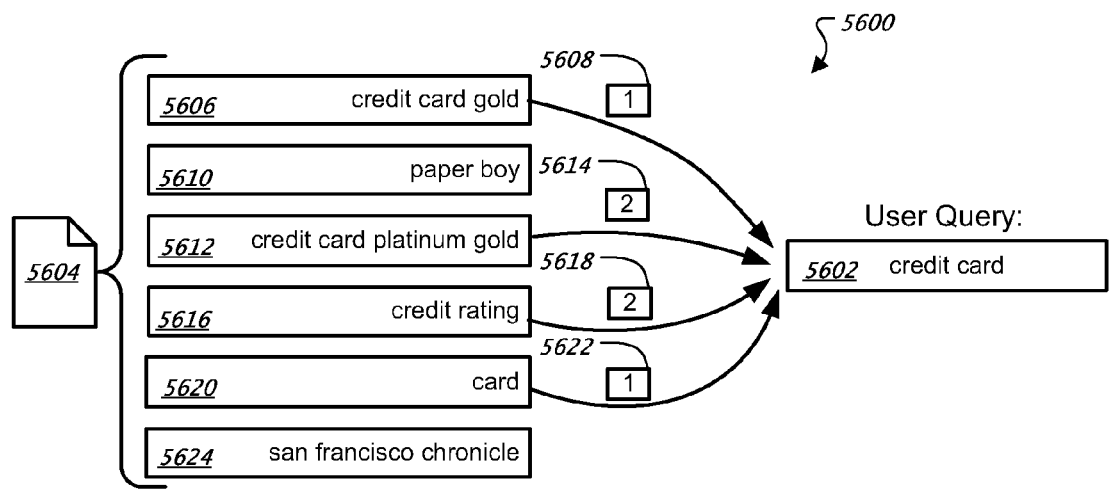
FIG. 5K is a diagram illustrating partial query matching generalization.

FIG. 5K is a diagram 5600 illustrating partial query matching generalization. A partial query match occurs when one or more terms in a user query match one or more terms in one or more queries for a given document in a model. Generalizing a user query in this fashion also allows for one or more terms not in common between the user query and a matching query.

In a first form of partial query matching, the user query terms are a subset of the model query terms. For example, a user query "tea party" is a subset of a model query "Wonderland tea party". Alternatively, model query terms can be a subset of user query terms. For example, a user query "photos of the golden gate bridge" includes all terms found within a model query "golden gate bridge". A subset of the user query can also match a subset of a model query. For example, a user query "lions tigers" and a model query "tigers bears" share the subset of terms "tigers". Other forms of partial query matching are possible.

In various implementations, in determining a partial query match the edit distance between a user query and a model query is calculated. The edit distance between a user query and a model query can be determined based on Levenshtein distance. The edit distance is the minimum number of operations needed to transform one query into the other, where an operation is an insertion, deletion, or substitution of a term. In some implementations, the edit distance can be determined at the character or semantic concept level. For example, the query "child's metal wagon" has an edit distance of three from the query "red wagon", because the terms "child's" and "metal" would have to be dropped, as well as the term "red" added to the first query, so that the two queries would be identical. Edit distance can be used to determine a level of certainty in a model query being a good indicator of relevance for a user query.

For example, a set of queries 5606, 5610, 5612, 5616, 5620, and 5624 are associated with the document 5604 in a model. The query 5606 "credit card gold", is a superset of the user query 5602 "credit card". An edit distance 5608 between the model query 5606 and the user query 5602 of one is calculated by counting the term "gold" which only occurs within the model query 5606. There are no common terms between the user query 5602 "credit card" and the model query 5610 "paper boy". Therefore, the model query 5610 is not a partial match. The model query 5612 "credit card platinum gold" is a superset of the user query 5602 "credit card". There is an edit distance 5614 of two between the model query 5612 and the user query 5602 because both the terms "gold" and "platinum" only occur within the model query 5612.

A subset of the terms within the model query 5616 "credit rating" matches a subset of the terms within the user query 5602. An edit distance 5618 between the model query 5616 and the user query 5602 is calculated as two, because the term "rating" would need to be both removed from the model query 5616 and replaced with the term "card" for the two queries to match. The model query 5620 "card" is a subset of the user query 5602 "credit card". An edit distance 5622 of one exists between them because the term "credit" would have to be added to the model query 5620 to cause the two queries to match. There are no common terms between the model query 5624 "san Francisco chronicle" and the user query 5602 "credit card" therefore the model query 5624 does not qualify as a partial match.

Figure 5L:
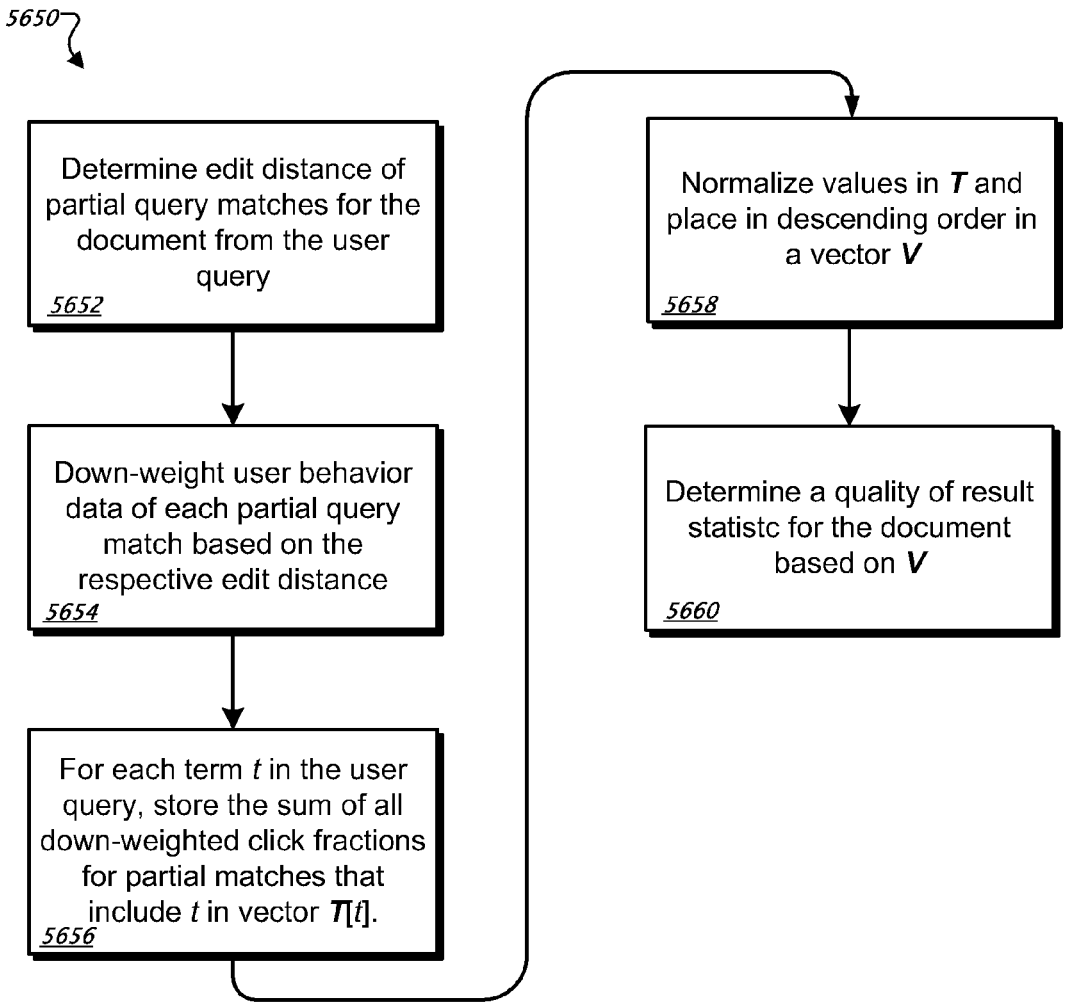
FIG. 5L is flow chart of a method for partial query matching.

FIG. 5L is flow chart of a method 5650 for partial query matching. First, an edit distance between a user query and each partial query match for a given document is determined (step 5652). The edit distances are used to down-weight the user behavior data associated with each partial query match based on the respective edit distance (step 5654). The higher the edit distance, the lower the a level of certainty in the user behavior data for the user query. In various embodiments, user behavior data associated with partial query matches are exponentially decayed. However, other techniques for down-weighting user data are possible.

The exponential decay models the loss of the semantic context when terms are missing and can prevent an overestimate of the relevance of loose matches. In various implementations, a down-weighted dw click fraction $f$ is defined as:

$$df(nq,uq) = f(nq,uq) \times (1 + ed(nq,uq))^k$$

where nq is a partial match model query, uq is the user query, ed is a function returning the edit distance between nq and uq, and k is a constant greater than one. The function $f$ is a so-called click fraction which is a weighted average of click data for a given tuple. By way of illustration, $f$ is defined as:

$$f = \frac{\#wc(\text{query, document})}{\#c(\text{query})}$$

where #wc is the sum of weighted clicks for the query-document pair, and #c is the total number of clicks for the query-document pair. However, other definitions off are possible. Each down-weighted click fraction represents a relative contribution of a partial query match that covers the entire user query or a subset of the user query. A vector T containing an element for each term t in the user query can store the sum of all down-weighted click fractions of partial matches related to t (step 5656):

$T[t] = \Sigma df(nq,uq)$ where $t \in nq$

The values stored in T are normalized and placed in a vector V (step 5658). For example, each value T[t] can be normalized by the sum of all the terms within the user query.

The final click fraction $ff$ for the document can be calculated as follows:

$$ff = \frac{(\text{median}(V) + a * \text{min}(V))}{1 + a}$$

where a is a constant factor that determines how much the final click fraction is reduced (step 5660).

Figure 5O:
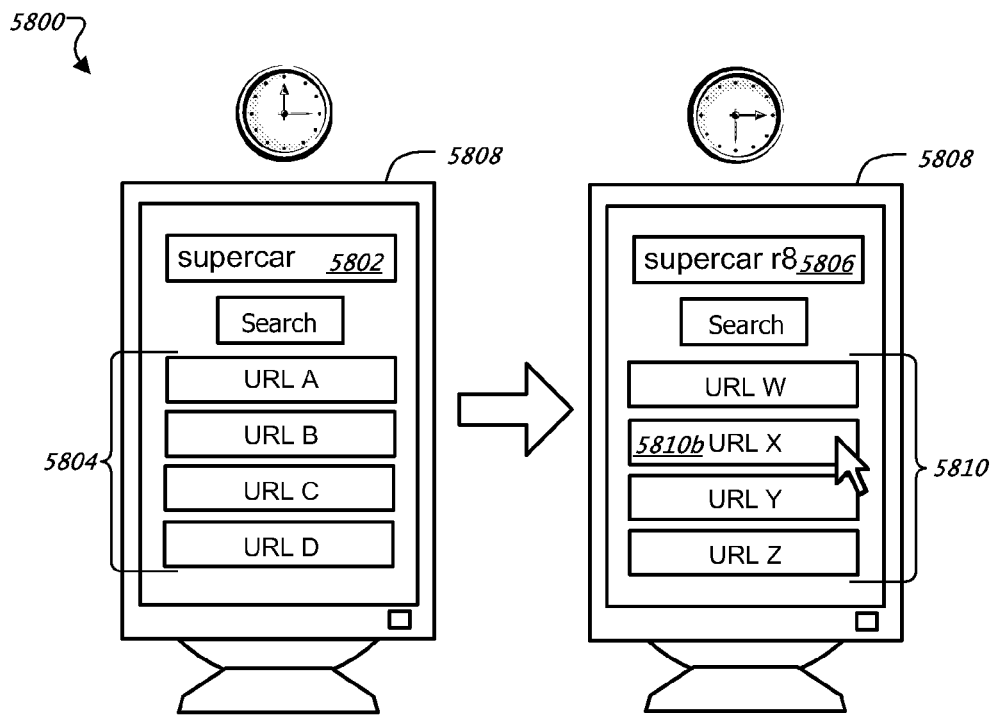
FIG. 5O is a diagram illustrating a method of identifying related tuples.

FIG. 5O is a diagram illustrating a method 5800 of identifying related tuples. There are times when users will refine a query if a result list does not contain a document they find relevant. For example, a user looking for information regarding the Tea House Restaurant in Plymouth, Minn. can submit a first query "tea house" to a search engine. The first query can locate many document references associated a variety of tea retailers and other tea-related items which are ranked higher within a result list than a document reference associated with the local Chinese restaurant. The user can then refine the first query to create a more specific query "tea house MN". In this way, users can increase the odds that the search engine will find the document they are looking for.

In various implementations, if the user finds the document they are looking for in response to a refined query (e.g., as indicated by a long click) within a user session, the click data is propagated to the user behavior data for the original query associated with that document. In various implementations, a user session is defined by time as well as an indicator that the user has moved onto to a topically different or unrelated query. For example, if a user's initial query was "Toyota celica" and their subsequent query is "best recipes", a new session is defined for the query "best recipes" since this query is topically unrelated to the original query. By way of further illustration, if the first query and the second query have query terms in common, it is likely that the two are unrelated. For example, if a user submits a first query 5802 "supercar" to a user interface 5808 at a first time, a search engine responds with a result list 5804. At a later time, the user submits a refined query 5806 to the user interface 5808. This time, the result list 5810 contains a document 5810*b* that the user finds relevant. The user behavior data for refined query and document 5810*b* combination is shared with the original query 5802 and document 5810*b* combination.

Figure 5P:
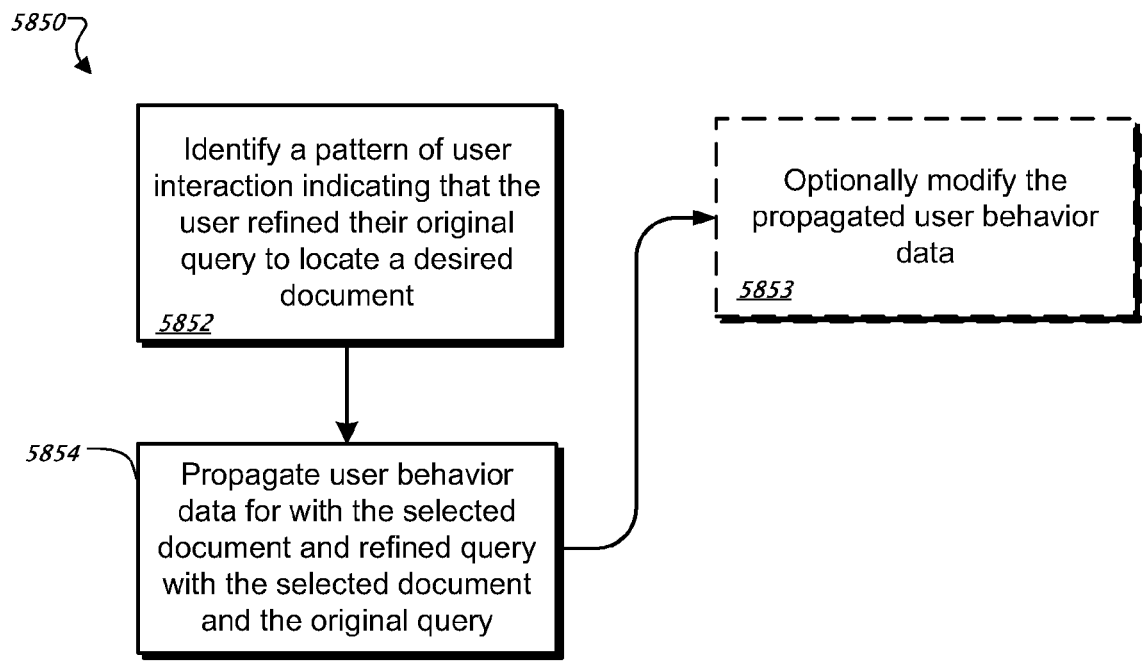
FIG. 5P is a flow chart of a method for identifying related tuples.

FIG. 5P is a flow chart of a method 5850 for identifying related tuples. A pattern of user interaction in a session is identified indicating that the user refined their original query to locate a desired document (step 5852). For example, a search engine (or other process) can track user interaction over time and identify instances where a user has selected a document in response to a refined query. Next, the user behavior data for with the selected document and refined query is propagated to the tuple for the selected document and the original query (step 5854). The shared data can optionally be down-weighted based on a level of certainty in the refined query (step 5853). Alternatively, user data associated with the original query and selected document can be propagated to the tuple for the refined query and selected document.

Figure 6:
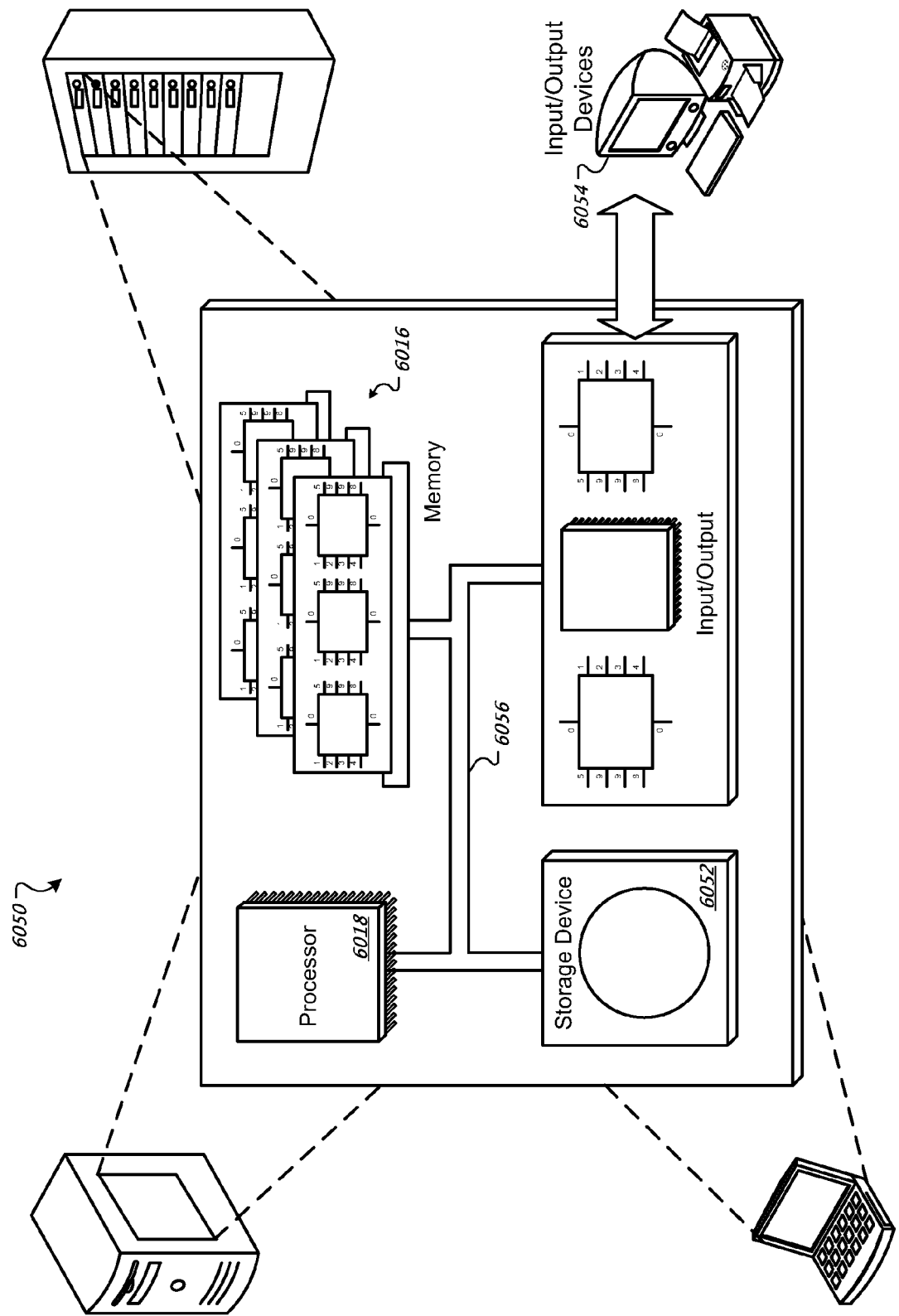
FIG. 6 is a schematic diagram of an example computer system.

FIG. 6 is a schematic diagram of an example computer system 6050. The system 6050 can be used for practicing operations described above. The system 6050 can include a processor 6018, a memory 6016, a storage device 6052, and input/output devices 6054. Each of the components 6018, 6016, 6052, and 6054 are interconnected using a system bus 6056. The processor 6018 is capable of processing instructions within the system 6050. These instructions can implement one or more aspects of the systems, components and techniques described above. In some implementations, the processor 6018 is a single-threaded processor. In other implementations, the processor 6018 is a multi-threaded processor. The processor 6018 can include multiple processing cores and is capable of processing instructions stored in the memory 6016 or on the storage device 6052 to display graphical information for a user interface on the input/output device 6054.

The memory 6016 is a computer readable medium such as volatile or non volatile that stores information within the system 6050. The memory 6016 can store processes related to the functionality of the search engine 1030, for example. The storage device 6052 is capable of providing persistent storage for the system 6050. The storage device 6052 can include a floppy disk device, a hard disk device, an optical disk device, or a tape device, or other suitable persistent storage mediums. The storage device 6052 can store the various databases described above. The input/output device 6054 provides input/output operations for the system 6050. The input/output device 6054 can include a keyboard, a pointing device, and a display unit for displaying graphical user interfaces.

The computer system shown in FIG. 6 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance (such as GOGGLE® in a Box, provided by Google Inc. of Mountain View, Calif.) installed in an enterprise network.

The invention claimed is:

1. A computer-implemented method comprising:
  receiving a user-submitted query;
  generating an initial ranking of one or more documents responsive to the user-submitted query, the one or more documents including a first document responsive to the user-submitted query;
  determining that the user-submitted query does not match any record in a model of queries and documents, the model comprising a plurality of records, each record specifying an association between a respective model query, a respective model document, and respective click data aggregated for all users that select the respective model document in response to the respective model query;
  in response to determining that the user-submitted query does not match any record in the model, forming one or more variants of the user-submitted query to generate one or more other queries that each match a respective record in the model, each of the one or more other queries being different from the user-submitted query;
  deriving a generalized quality of result statistic for the first document responsive to the user-submitted query from respective data associated in the model with one or more of the other queries, wherein:
    the respective data for a given other query of the one or more of the other queries is associated with the matching respective record in the model and specifies aggregate user behavior for the first document when the first document was referenced in search results for the given other query, and
    the user behavior in selection of a reference to the first document in the search results for the given other query; and
  providing the generalized quality of result statistic as input to a subsequent document ranking process for the user-submitted query that generates, using the generalized quality of result statistic for the first document responsive to the user-submitted query, a subsequent ranking of the one or more documents responsive to the user-submitted query.

2. The method of claim 1 where:
  the respective data associated in the model with one or more of the other queries comprises aggregated click data, wherein the aggregated click data is based on a weighted average of a count of long clicks for the first document in the search results for each of the one or more of the other queries.

3. The method of claim 1 where forming one or more variants of the user-submitted query includes:
  attempting one or more variations of the user-submitting query until a match within the model has been located.

4. The method of claim 1 where the deriving includes:
  modifying the quality of result statistic based on a level of certainty for each of the generated one or more queries.

5. The method of claim 1 where a variant of the user-submitted query is formed by performing one or more of:
  replacing one or more terms in the user-submitted query with synonyms,
  changing an order of one or more terms in the user-submitted query,
  or replacing one or more query terms in user-submitted query with stems.

6. A computer program product tangibly embodied in a non-transitory a computer-readable storage device, the computer program product including instructions configured to cause one or more data processing apparatus to perform operations comprising:
  receiving a user-submitted query;
  generating an initial ranking of one or more documents responsive to the user-submitted query, the one or more documents including a first document responsive to the user-submitted query;
  determining that the user-submitted query does not match any record in a model of queries and documents, the model comprising a plurality of records, each record specifying an association between a respective query, a respective document, and respective click data aggregated for all users that select the respective model document in response to the respective model query;
  in response to determining that the user-submitted query does not match any query in the model, forming one or more variants of the user-submitted query to generate one or more other queries that each match a respective record in the model, each of the one or more other queries being different from the user-submitted query;
  deriving a generalized quality of result statistic for the first document responsive to the user-submitted query from respective data associated in the model with one or more of the other queries, wherein:
    the respective data for a given other query of the one or more of the other queries is associated with the matching respective record in the model and specifies aggregate user behavior for the first document when the first document was referenced in search results for the given other query, and
    the user behavior in selection of a reference to the first document in the search results for the given other query; and
  providing the generalized quality of result statistic as input to a subsequent document ranking process for the user-submitted query that generates, using the generalized quality of result statistic for the first document responsive to the user-submitted query, a subsequent ranking of the one or more documents responsive to the user-submitted query.

7. The program product of claim 6 where:
  the respective data associated in the model with one or more of the other queries comprises aggregated click data, wherein the aggregated click data is based on a weighted average of a count of long clicks for the first document in the search results for each of the one or more of the other queries.

8. The program product of claim 6 where forming one or more variants of the user-submitted query includes:

attempting one or more variations of the user-submitting query until a match within the model has been located.

9. The program product of claim 6 where the deriving includes:
modifying the quality of result statistic based on a level of certainty for each of the generated one or more queries.

10. The program product of claim 6 where a variant of the user-submitted query is formed by performing one or more of:
replacing one or more terms in the user-submitted query with synonyms,
changing an order of one or more terms in the user-submitted query,
or replacing one or more query terms in user-submitted query with stems.

11. A system comprising:
a computer-readable storage device including instructions; and
one or more data processing apparatuses configured to execute the instructions and perform operations, comprising:
receiving a user-submitted query;
generating an initial ranking of one or more documents responsive to the user-submitted query, the one or more documents including a first document responsive to the user-submitted query;
determining that the user-submitted query does not match any record in a model of queries and documents, the model comprising a plurality of records, each record specifying an association between a respective query, a respective document, and respective click data aggregated for all users that select the respective model document in response to the respective model query;
in response to determining that the user-submitted query does not match any query in the model, forming one or more variants of the user-submitted query to generate one or more other queries that each match a respective record in the model, each of the one or more other queries being different from the user-submitted query;
deriving a generalized quality of result statistic for the first document responsive to the user-submitted query from respective data associated in the model with one or more of the other queries, wherein:
the respective data for a given other query of the one or more of the other queries is associated with the matching respective record in the model and specifies aggregate user behavior for the first document when the first document was referenced in search results for the given other query, and
the user behavior in selection of a reference to the first document in the search results for the given other query; and
providing the generalized quality of result statistic as input to a subsequent document ranking process for the user-submitted query that generates, using the generalized quality of result statistic for the first document responsive to the user-submitted query, a subsequent ranking of the one or more documents responsive to the user-submitted query.

12. The system of claim 11 where:
the respective data associated in the model with one or more of the other queries comprises aggregated click data, wherein the aggregated click data is based on a weighted average of a count of long clicks for the first document in the search results for each of the one or more of the other queries.

13. The system of claim 11 where forming one or more variants of the user-submitted query includes:
attempting one or more variations of the user-submitting query until a match within the model has been located.

14. The system of claim 11 where the deriving includes:
modifying the quality of result statistic based on a level of certainty for each of the generated one or more queries.

15. The system of claim 11 where a variant of the user-submitted query is formed by performing one or more of:
replacing one or more terms in the user-submitted query with synonyms,
changing an order of one or more terms in the user-submitted query,
or replacing one or more query terms in user-submitted query with stems.

* * * * *